US011940671B2

(12) United States Patent
Seki

(10) Patent No.: US 11,940,671 B2
(45) Date of Patent: *Mar. 26, 2024

(54) SPECTACLE-LIKE FRAME

(71) Applicant: Norio Seki, Shizuoka (JP)

(72) Inventor: Norio Seki, Shizuoka (JP)

( * ) Notice: Subject to any disclaimer, the term of this patent is extended or adjusted under 35 U.S.C. 154(b) by 769 days.

This patent is subject to a terminal disclaimer.

(21) Appl. No.: 17/044,686

(22) PCT Filed: Apr. 2, 2018

(86) PCT No.: PCT/JP2018/014101
§ 371 (c)(1),
(2) Date: Oct. 1, 2020

(87) PCT Pub. No.: WO2019/193623
PCT Pub. Date: Oct. 10, 2019

(65) Prior Publication Data
US 2021/0149214 A1     May 20, 2021

(51) Int. Cl.
*G02C 5/04* (2006.01)
*G02C 1/02* (2006.01)
*G02C 5/12* (2006.01)

(52) U.S. Cl.
CPC ............. *G02C 5/04* (2013.01); *G02C 1/02* (2013.01); *G02C 5/12* (2013.01); *G02C 2200/02* (2013.01)

(58) Field of Classification Search
None
See application file for complete search history.

(56) References Cited

U.S. PATENT DOCUMENTS 2,446,725 A * 8/1948 Seguin ............... G02C 5/124
351/132
3,698,801 A * 10/1972 Masucci ............... G02C 5/124
351/107
(Continued)

FOREIGN PATENT DOCUMENTS

CN     203069896 U     7/2013
CN     103969847 A     8/2014
(Continued)

OTHER PUBLICATIONS

International Search Report (in English and Japanese) issued in PCT/JP2018/014101, dated Jun. 19, 2018; ISA/JP.
(Continued)

*Primary Examiner* — Darryl J Collins
(74) *Attorney, Agent, or Firm* — Harness, Dickey & Pierce, P.L.C.

(57) ABSTRACT

An eyeglass-shaped frame includes: a pair of temples; a connecting bar connecting ends of the pair of temples; a shaft hanging from a middle of the connecting bar; nose pads fixed to the shaft; a pair of holding frames holding vertically arranged optical members; a bridge connecting the pair of holding frames; and a slider allowing the holding frames to slide vertically in front of the connecting bar. The bridge is provided at a position lower than a center of the lower optical member of the holding frames. The holding frames are slidable for a distance at least corresponding to a distance between a center of an upper optical member and the center of the lower optical member.

17 Claims, 22 Drawing Sheets

(56) References Cited

U.S. PATENT DOCUMENTS

| | | | | |
|---|---|---|---|---|
| 5,499,063 A * | 3/1996 | Butler | ............... | G02C 13/003 |
| | | | | 351/41 |
| 6,554,422 B2 * | 4/2003 | Bell | ............... | G02C 5/124 |
| | | | | 351/128 |
| 11,169,395 B2 * | 11/2021 | Seki | ............... | G02C 5/124 |

FOREIGN PATENT DOCUMENTS

| | | |
|---|---|---|
| JP | S5652721 U | 5/1981 |
| JP | H07159733 A | 6/1995 |
| JP | H07199126 A | 8/1995 |
| JP | 3031992 U | 12/1996 |
| JP | 2001142031 A | 5/2001 |
| JP | 2002539493 A | 11/2002 |
| JP | 2009003335 A | 1/2009 |
| JP | 2010102025 A | 5/2010 |
| JP | 2012502318 A | 1/2012 |
| JP | 201485363 A | 5/2014 |
| KR | 2011-0063822 A | 6/2011 |
| WO | 2018066245 A1 | 4/2018 |

OTHER PUBLICATIONS

Office Action issued in corresponding Taiwanese Patent Application No. 107111709, dated Aug. 8, 2020 (non- English, a translation will be filed later).

Office Action for corresponding Taiwanese Patent Application No. TW 107111709, dated Aug. 11, 2020 (with partial English translation).

* cited by examiner

SPECTACLE-LIKE FRAME

CROSS REFERENCE TO RELATED APPLICATIONS

This application is a U.S. National Phase Application under 35 U.S.C. 371 of International Application No. PCT/JP2018/014101 filed on Apr. 2, 2018. The entire disclosure of the above application is incorporated herein by reference.

BACKGROUND

Technical Field

The present invention relates to an eyeglass-shaped frame.

Related Art

Eyeglass-shaped frames usable for near-sighted glasses, far-sighted glasses, sunglasses and the like have been known.

In addition, an eyeglass-shaped frame usable for a wearable terminal in an eyeglass form (also referred to as smart-glasses) has been known.

In the case of a typical eyeglass-shaped frame, for instance, when exchanging eyeglasses with an eyeglasses-type wearable terminal, or when exchanging near-sighted glasses with far-sighted glasses, a user must take off eyeglasses once and put on another one, which is annoying.

In contrast, in a typical pair of bifocal glasses, an upper side of each lens (optical member) is used for a long-distance vision and a lower side of the lens is used for a short-distance vision. A user wearing the typical glasses changes an eye direction or a view angle; specifically, the user looks upward at a distant object, whereas the user looks downward at a nearby object. With such glasses, the user looks at the object with eyes directed downward from a horizontal level as shown in FIG. 22A. In particular, the user is forced to look at a nearby object in an unnatural eye direction, although it is natural for the user to look squarely (horizontally) at the object (i.e., the user looks at the object with an eye level of the user being aligned with the center of each lens). Such an unnatural manner of looking would tire the user, frequently causing eyestrain.

In order to solve this problem, there has been made a proposal of setting the lower portion of each lens, which is intended for the short-distance vision, closer to the eye level, and vertically moving only the nose pad to allow the user to look at the object in an eye direction. According to this proposal, when the user looks at the object in a downward eye direction with respect to the horizontal level as shown in FIG. 22B, although the user can look at the object at a level closer to the eye level with a less downward displacement of the line of sight as compared with the use of the lenses shown in FIG. 22A, eyestrain is still easily caused.

Moreover, the invertible glasses are exemplified by glasses disclosed in JP 7-199126 A. The invertible glasses can be worn in an inverted manner by inverting the temple to vertically move the ear pieces and vertically displacing the nose pads to allow the eyes to be present near the center of a portion for a long-middle-distance or short-distance vision.

However, since an attachment portion of each temple of the invertible glasses is provided on an outer periphery of a frame of the glasses at the middle height of the frame, the eye direction is aligned with a border between the upper and lower lenses when the glasses are inverted, causing a difficulty in looking at the object. Accordingly, after the glasses are inverted for use, the level of the nose pads always needs to be adjusted by vertically moving the nose pads. The eye level at this time is as shown in FIG. 22C, causing misalignment of the eye level of the user, so that eyestrain cannot be eliminated.

In addition to the above examples, proposed examples of the invertible glasses in the above type of glasses configured to be inverted in use include Japanese Utility Model Application Publication No. 56-52721 A, JP 2014-85363 A, Japanese Utility Model Registration No. 3031992 U, and JP 7-159733 A. However, none of them cannot solve the above problem.

Moreover, in the above typical technology, there is no idea of situationally using a plurality of optical members, such as different types of lenses and displays, for a single eyeglass-shaped frame.

CITATION LIST

Patent Literature(s)

Patent Literature 1: JP 7-199126 A
Patent Literature 2: Japanese Utility Model Application Publication No.56-52721 A
Patent Literature 3: JP 2014-85363 A
Patent Literature 4: Japanese Utility Model Registration No. 3031992 U
Patent Literature 5: JP 7-159733 A An object of the invention is to provide an eyeglass-shaped frame that allows for switching a plurality of optical members such as different types of lenses or displays in accordance with an intended use, and reducing eyestrain.

SUMMARY

According to an aspect of the invention, an eyeglass-shaped frame includes: a pair of temples; a connecting bar connecting respective ends of the pair of temples; at least one shaft hanging from a middle of the connecting bar; nose pads fixed to the shaft; a pair of holding frames each configured to hold vertically arranged optical members; a bridge connecting the pair of holding frames; and a slider configured to allow the holding frames to vertically slide in front of the connecting bar, in which the bridge is attached at a position lower than a center of a lower one of the optical members in each of the holding frames, and the holding frames are slidable for a distance at least corresponding to a distance between a center of an upper one and the center of the lower one of the optical members.

According to the above aspect of the invention, since the plurality of optical members can be easily switched and the centers of the optical members can be aligned with the eye level of the user, the user can look straight at the object, so that eyestrain is reducible.

In the above arrangement, it is preferable that the optical members are lenses or displays.

In the above arrangement, it is preferable that both ends of the connecting bar are provided by vertical portions bent downward, the vertical portions extend downward beyond a level of the temples, and the holding frames respectively include guides interposed between the holding frames and the corresponding vertical portions.

In the above arrangement, since the guides are provided, wiggling of the holding frames can be reduced, so that the holding frames can vertically move in a smooth manner.

In the above arrangement, it is preferable that the shaft is in a form of a polygonal column, the slider includes: a slide bearing configured to receive the shaft therein such that the slide bearing is slidable along the shaft; a holder configured to hold the slide bearing at a predetermined position on the shaft; and an antidrop member provided to an end of the shaft, and the holder includes: an engagement piece attached to the slide bearing; and a spring for pressing the engagement piece against the shaft.

In the above arrangement, it is preferable that the slider includes: a clip body with a resilience enough to hold the shaft; and tabs for opening an end of the clip body.

In the above arrangement, it is preferable that the at least one shaft includes a pair of shafts, the pair of shafts being each provided with a fall stopper at a lower end thereof, and the slider includes: sliding portions configured to receive the respective shafts therein such that the sliding portions are slidable along the respective shafts; a plate spring with a resilience enough for holding the sliding portions on the respective shafts; and operation tabs for opening the plate spring.

In the above arrangement, it is preferable that the shaft is in a form of a polygonal column, and the slider includes: a slide bearing configured to receive the shaft therein such that the slide bearing is slidable along the shaft; magnets configured to be attracted to respective upper and lower ends of the shaft; and sheet irons attached to respective upper and lower ends of the slide bearing.

In the above arrangement, it is preferable that the shaft is in a form of a polygonal column, and the slider includes: a slide bearing configured to receive the shaft therein such that the slide bearing is slidable along the shaft; two locking grooves provided to a surface of the slide bearing; and locking pieces provided to respective upper and lower ends of the shaft, the locking pieces being engageable with the respective locking grooves.

According to the above aspect of the invention, the eyeglass-shaped frame with a simple structure can vertically move in a smooth manner.

According to another aspect of the invention, an eyeglass-shaped frame includes: a pair of temples; a connecting bar connecting respective ends of the pair of temples; a shaft hanging from a middle of the connecting bar; nose pads fixed to the shaft; a pair of holding frames each configured to hold vertically arranged optical members; a bridge connecting the pair of holding frames; and a clip member fixed to a middle of the bridge and being detachable from the shaft, in which the holding frames are located in front of the connecting bar.

According to the above aspect of the invention, a plurality of optical members can be easily switched by vertically inverting the holding frame. Since the plurality of optical members can be easily switched by vertically inverting only the holding frames without moving the temples and the nose pads and such vertical inversion of the holding frames does not cause misalignment of the eye level of the user, eyestrain is reduced.

In the above arrangement, it is preferable that the shaft is in a form of a polygonal column, and the clip member includes: a clip body with a resilience enough to hold the shaft; and tabs for opening an end of the clip body.

In the above arrangement, it is preferable that the shaft is in a U-shape, and the clip member includes: a pair of insertion portions configured to receive the shaft therein; a substantially triangular plate spring to which respective ends of the insertion portions are fixed; and operation tabs for opening the plate spring to increase a distance between the insertion portions.

According to another aspect of the invention, an eyeglass-shaped frame includes: a pair of temples; a connecting bar connecting respective ends of the pair of temples; a shaft standing at a middle of the connecting bar; nose pads fixed to the shaft; a pair of holding frames each configured to hold vertically arranged optical members; a bridge connecting the pair of holding frames at a middle height of the holding frames; and a bearing fixed to a middle of the bridge and receiving the shaft therein, in which a middle portion of the connecting bar is a stepped portion located lower than a level of the temples, the shaft stands upward from the stepped portion of the connecting bar, and the holding frames are located in front of the connecting bar.

According to the above aspect of the invention, a plurality of optical members can be easily switched by vertically inverting the holding frame. Since the plurality of optical members can be easily switched by vertically inverting only the holding frames without moving the temples and the nose pads and such vertical inversion of the holding frames does not cause misalignment of the eye level of the user, eyestrain is reduced.

In the above arrangement, it is preferable that the shaft is in a form of a polygonal column having an end provided with a resilient slotted portion.

According to the above aspect of the invention, the eyeglass-shaped frame with a simple structure can be vertically inverted.

In the above arrangement, it is preferable that the optical members are lenses or displays.

In the above arrangement, it is preferable that the connecting bar includes: top sides facing the respective holding frames; and vertical portions that are bent downward from respective ends of the top sides, the temples are connected to the respective vertical portions, and the holding frames respectively includes guides interposed between the holding frames and the corresponding vertical portions.

In the above arrangement, wiggling of the holding frames can be reduced by providing the guides.

DETAILED DESCRIPTION

Figure 1:
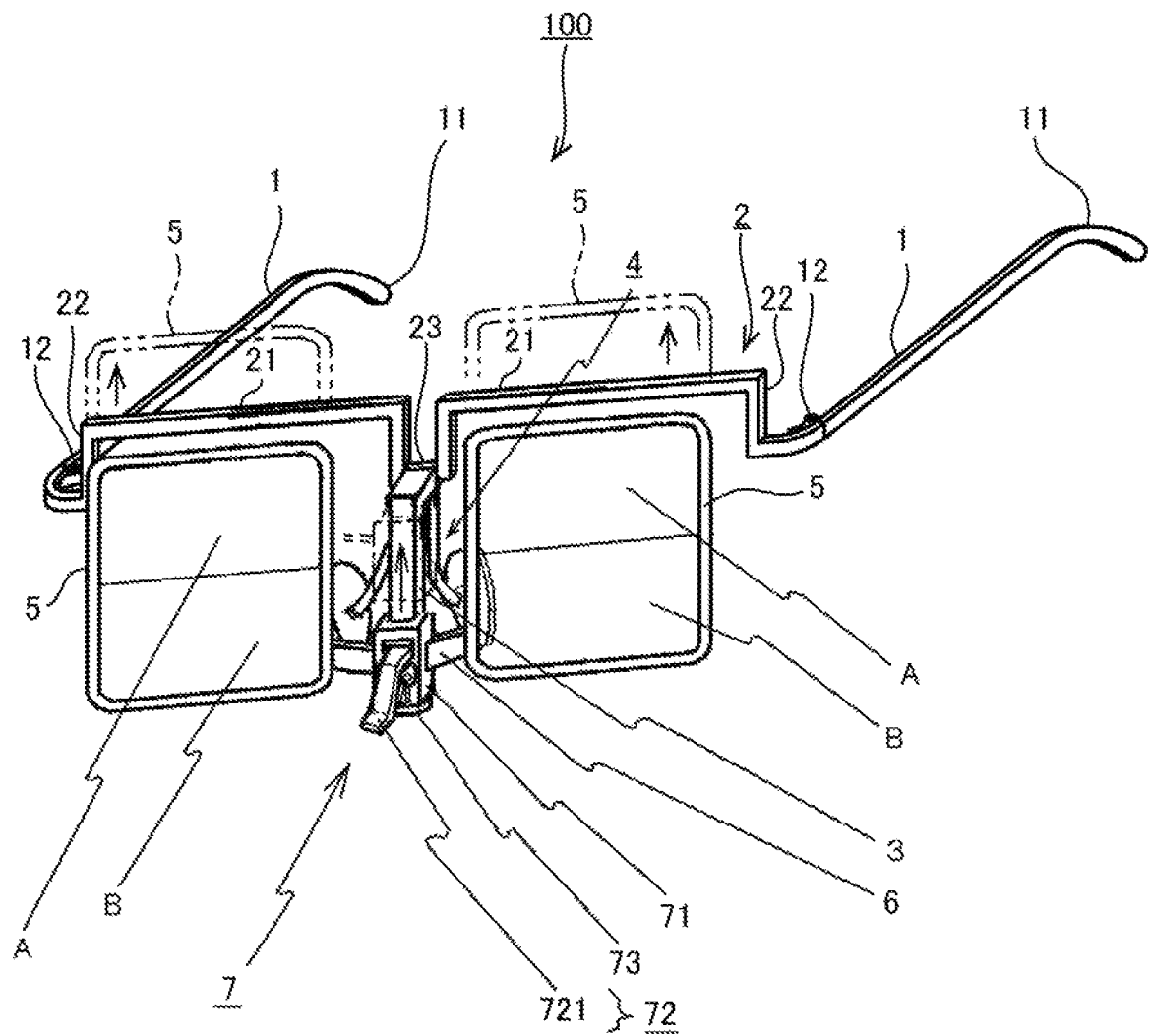
FIG. 1 is a perspective view of an eyeglass-shaped frame according to a first exemplary embodiment of the invention.

Exemplary embodiments of the invention will be described below with reference to the attached drawings.

The same reference characters refer to the same parts described in first, second and subsequent exemplary embodiments and any repetitive detailed description thereof are omitted or simplified.

First Exemplary Embodiment

A first exemplary embodiment of the invention will be described with reference to FIGS. 1 and 2.

Figure 2:
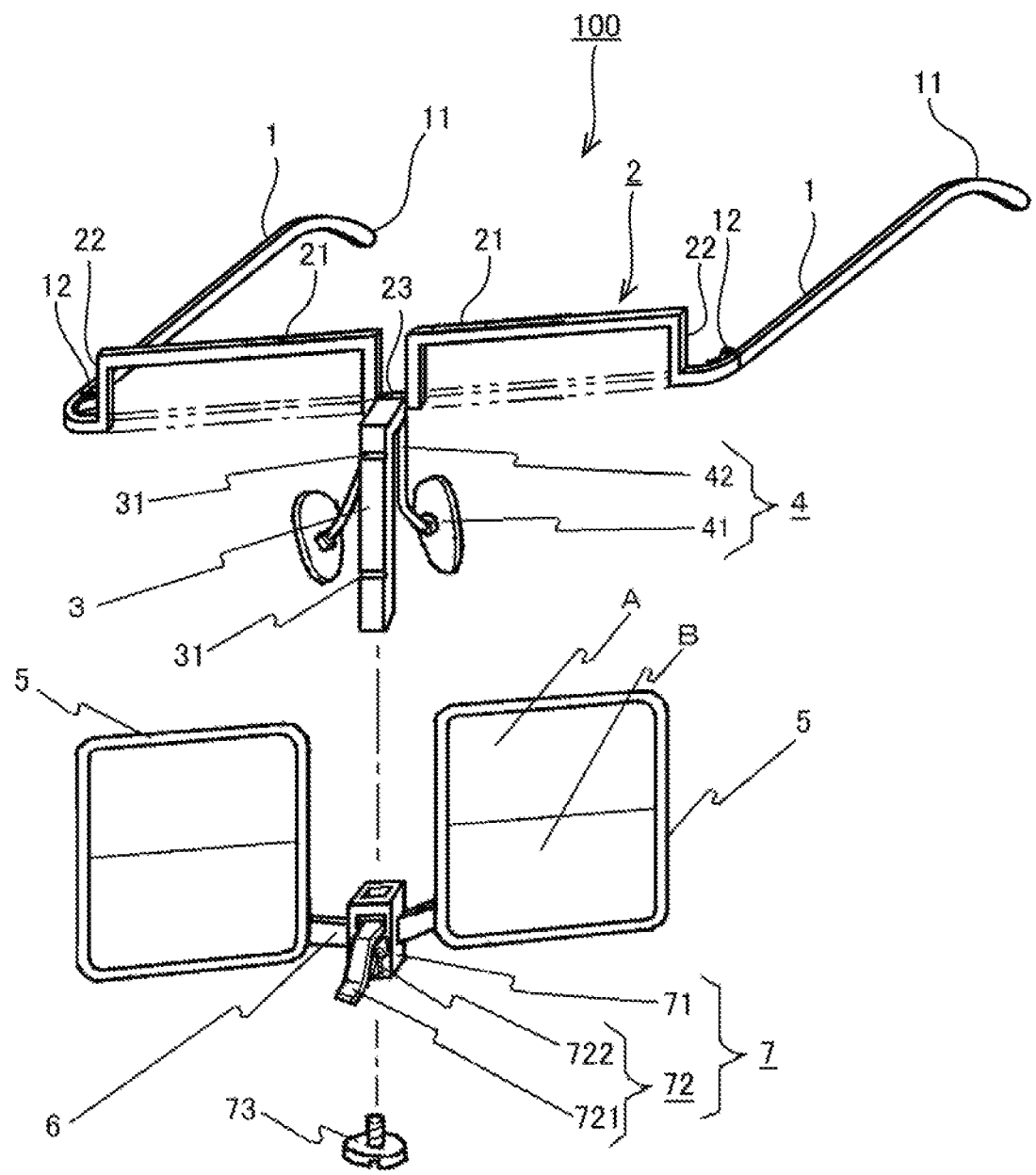
FIG. 2 is an exploded perspective view of the eyeglass-shaped frame in FIG. 1.

As shown in FIGS. 1 and 2, an eyeglass-shaped frame 100 includes a pair of temples 1, a connecting bar 2, a shaft 3, nose pads 4, a pair of holding frames 5, a bridge 6, and a slider 7.

The temples 1 are attached to the connecting bar 2 such that the temples 1 are foldable at front ends. The temples 1 each include an ear piece 11 at a rear end thereof. Hinges 12 for attaching the temples 1 to the connecting bar 2 such that the temples 1 are foldable are provided to the respective front ends of the temples 1. A typical hinge is usable as the hinges 12.

The connecting bar 2 connects the front ends of the temples 1. The connecting bar 2 and the temples 1 are the same or substantially the same in thickness. The connecting bar 2 incudes: top sides 21 above the temples 1 in height; vertical portions 22 bent downward at ends of the top sides 21; and a stepped portion 23 that is a downward step in the middle of the connecting bar 2 with respect to the top sides 21. The top sides 21 are formed so as to be positioned above a position shown by two-dot chain lines in FIG. 2 by one-fourth of a total height of lenses A and B (optical members) (i.e., a whole length of the lenses A and B in a vertical direction). A distance between the vertical portions 22 is defined substantially at the same as or more than the width of the holding frames 5. With this arrangement, the eyeglass-shaped frame 100 is designed such that the connecting bar 2 does not come into a field of vision of a user wearing the frame 100 (see FIGS. 8A and 8B). Alternatively, the connecting bar 2 may be formed straight as shown in the two-dot chain lines in FIG. 2 so as not to disadvantageously come into the field of vision.

The shaft 3 is a clear synthetic resin-made shaft hanging from the middle of the connecting bar 2. The shaft 3, which is in the form of a polygonal column (e.g., square column), projects slightly forward with respect to the connecting bar 2). Two engagement grooves 31, with each of which an end of a later-described engagement piece 721 is engageable for positioning, are formed on a surface of the shaft 3. A distance between the two engagement grooves 31 is equal to a distance between respective centers of the lenses A and B. The engagement grooves 31 each preferably have a U-shaped cross section. It should be noted that although the shaft 3 is preferably made of a clear synthetic resin, the color and material thereof are not limited.

The nose pads 4 are fixed to the shaft 3. Each of the nose pads 4 includes a pad 41 and a support bar 42. An upper end of the support bar 42 is fixed to the shaft 3.

Each of the holding frames 5 holds the vertically arranged lenses A and B. Each of the holding frames 5 surrounds a periphery of the lenses A and B. However, the arrangement of each of the holding frames 5 is not limited thereto. Each of the holding frames 5 may be a frame not surrounding the periphery of the lenses A and B (e.g. of frameless glasses) or a straight frame.

Examples of the lenses A and B held by the holding frames 5 include a variety of light transmissive members such as a concave lens, a convex lens, a sheet glass (a plain or a polarizer), a colored glass (e.g., sunglasses), and a wearable terminal glass (occasionally referred to as a display of a wearable terminal in an eyeglass form). The wearable terminal glass, which is a light transmissive member constituting a display of a transmissive (see-through) wearable terminal in an eyeglass form, is configured to display information projected from a projector (not shown). The wearable terminal glass includes therein an optical device such as a prism, a mirror, a semitransparent mirror, or a hologram device. It should be noted that the projector may be held by the holding frames 5 or may be held by the temples 1 and/or the connecting bar 2. A shape of each of the lenses A and B is not necessarily a rectangle shown in FIGS. 1 and 2 but may be a circle, an oval, or any other shape. The lenses A and B are not necessarily separate lenses but may be integrated into a single lens.

The bridge 6 integrally connects the pair of holding frames 5. The bridge 6 is positioned lower than the center of the lower lens in each of the holding frames 5. The shaft 3 may be elongated upward beyond the connecting bar 2 with the bridge 6 being attached at a level above the center of the lower lens in each of the holding frames 5.

Figure 3:
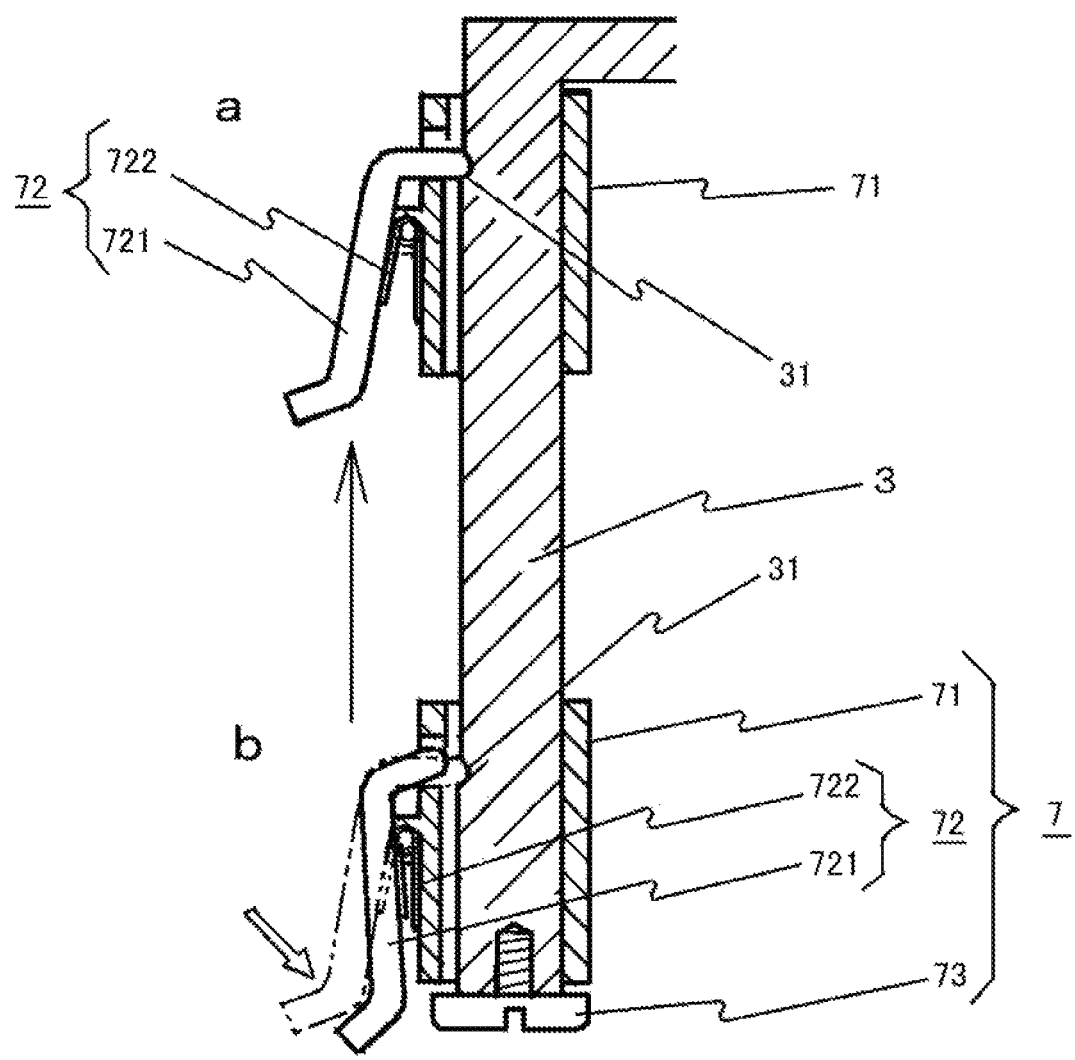
FIG. 3 illustrates an operation of a slider.

The slider 7 attaches the holding frames 5 to the shaft 3 such that the holding frames 5 are slidable along the shaft 3. The slider 7 includes: a slide bearing 71 made of a clear synthetic resin configured to receive the shaft 3 therein such that the slide bearing 71 is slidable along the shaft 3; a holder 72 made of a clear synthetic resin configured to hold the slide bearing 71 at a predetermined position on the shaft 3; and an antidrop member 73 provided to an end of the shaft 3. The slide bearing 71 is fixed to a middle of the bridge 6. The holder 72 includes an engagement piece 721 with an end engageable with either one of the engagement grooves 31 of the shaft 3 and a spring 722 exhibiting resilience for keeping the engagement between the engagement piece 721 and one of the engagement grooves 31. The end of the engagement piece 721 is rounded in an arc as shown in FIG. 3.

The slider 7 allows the holding frames 7 to vertically slide in front of the connecting bar 2. A possible sliding displacement of the slide bearing 71 corresponds to the vertical distance between the engagement grooves 31 (i.e., the distance between the respective centers of the lenses A and B), but may be defined larger than this distance with an allowance for extra slide. It should be noted that although the slide bearing 71 and the holder 72 are preferably made of a clear synthetic resin, the color and material thereof are not limited. The holder 72 for the slide bearing 71 may have a structure different from the above.

An operation of the slider 7 will be described below with reference to FIG. 3. First, the engagement piece 721 in a state shown by two-dot chain lines at a position "b" in FIG. 3 is pressed as shown by an outline arrow with a finger, disengaging the end of the engagement piece 721 from the lower engagement groove 31 as shown by solid lines. The slide bearing 71 is then moved upward in an arrow direction with a finger and released, bringing the end of the engagement piece 721 into contact with the surface of the shaft 3. As the slide bearing 71 in this state is moved upward with a finger, the end of the engagement piece 721 is engaged with the upper engagement groove 31. At this time, while the end of the engagement piece 721 is engaged with the upper engagement groove 31, a resilience of the spring 722 is applied to the end of the engagement piece 721, thus reliably stopping the slide bearing 71 at a position "a" in FIG. 3. As a result, the holding frames 5 are moved upward with an eye level of a user (the level of the temples) being aligned with the center of the lens B instead of the center of lens A.

Next, to move the slide bearing 71 from the position "a" to the position "b" in FIG. 3, the engagement piece 721 is pressed with a finger to disengage the end of the engagement piece 721 from the upper engagement groove 31 and, subsequently, the slide bearing 71 is moved downward to engage the end of the engagement piece 721 to the lower engagement groove 31. The slide bearing 71 is thus reliably returned to the position "b".

Figure 4:
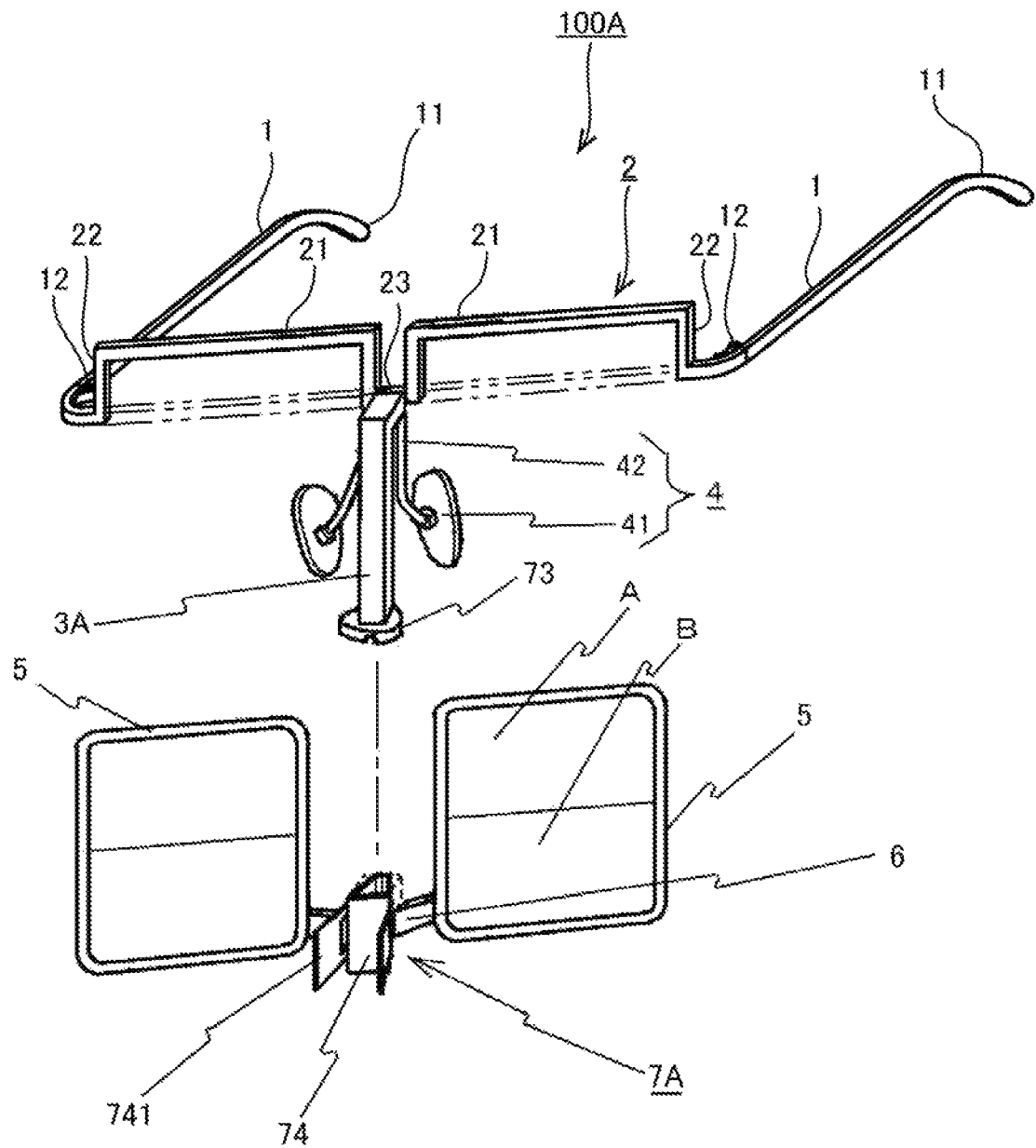
FIG. 4 is an exploded perspective view of a double-clip slider in use.

FIG. 4 is an exploded perspective view of an eyeglass-shaped frame 100A provided with a double-clip slider 7A. The slider 7A is clip member fixed to the middle of the bridge 6 and detachable from the shaft 3. The slider 7A includes a clip body 74 made of a clear synthetic resin formed by bending a flat spring into a trapezoid and openable at a portion corresponding to a top side of the trapezoid, tabs 741 made of a clear synthetic resin configured to open the clip body 74 so that the clip body 74 holds a shaft 3A, and the antidrop member 73 provided to an end of the shaft 3A. It should be noted that the shape of the clip body 74 may be in any other shape different from trapezoid allowing the clip body 74 to hold the shaft 3A so that the holding frames 5 are fixed. The clip body 74 and the tabs 741 are structurally substantially the same as a typical double clip used as stationery. The antidrop member 73 may be formed integrally with the shaft 3A. Although the clip body 74 and the tabs 741 are preferably made of a clear synthetic resin, the color and material thereof are not limited.

Figure 5:
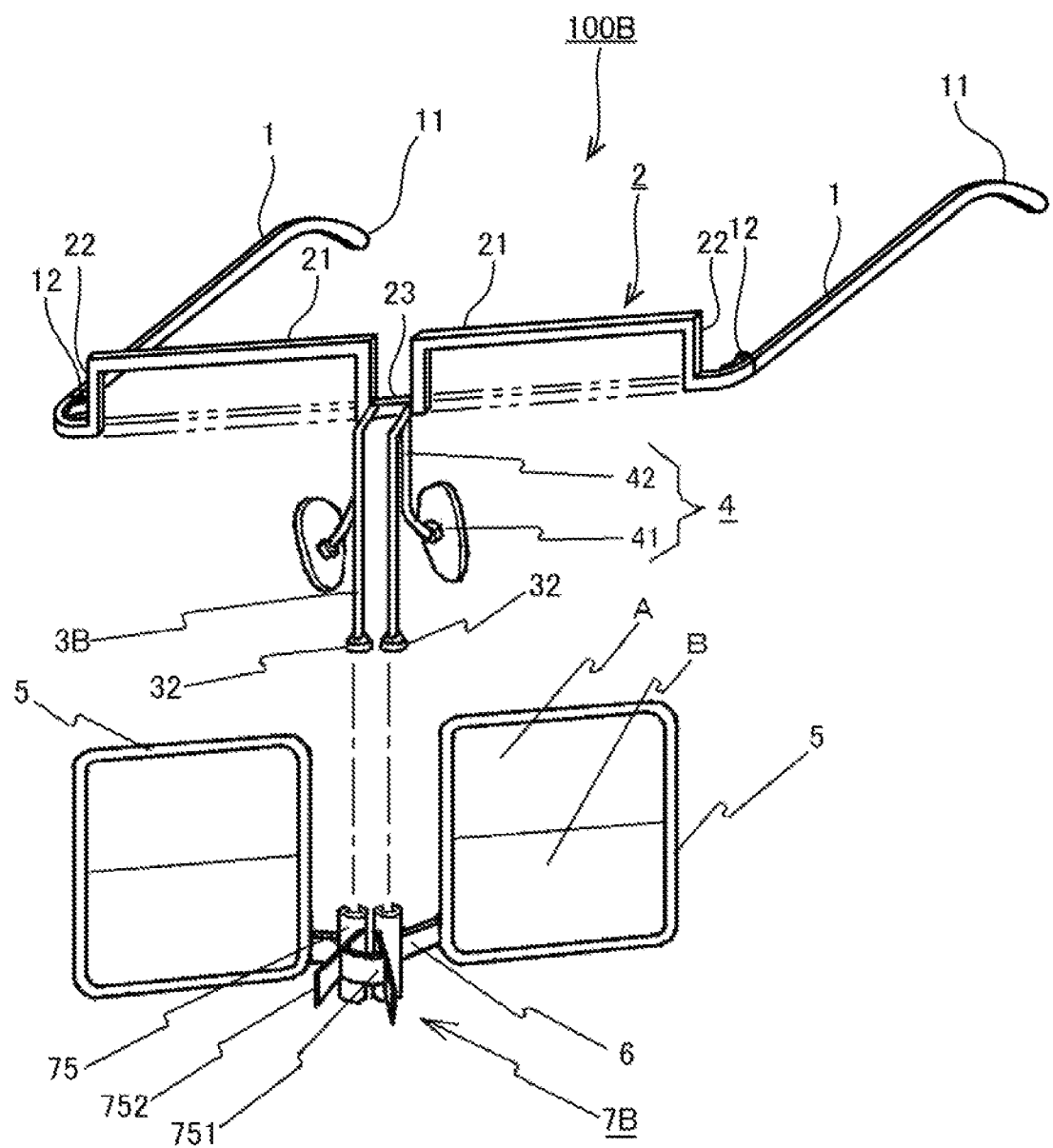
FIG. 5 is an exploded perspective view of another double-clip slider in use.

FIG. 5 is an exploded perspective view of an eyeglass-shaped frame 100B provided with a double clip type slider 7B. The slider 7B includes: sliding portions 75 made of a clear synthetic resin configured to receive a pair of shafts 3B therein such that the sliding portions 75 are each slidable along the corresponding shaft 3B; a plate spring 751 made of a clear synthetic resin exhibiting resilience enough for holding the sliding portions 75 on the respective shafts 3B; and operation tabs 752 made of a clear synthetic resin for opening the plate spring 751. A distance between the sliding portions 75 is changed using the operation tabs 752. Specifically, when the operation tabs 752 are not held by hand, the distance between the sliding portions 75 becomes narrow and a force making the distance narrower than a distance between the pair of shafts 3B is continuously applied, thus holding the holding frames 5 at current positions without dropping. It should be noted that a fall stopper 32 is provided to a lower end of each shaft 3B. Although the sliding portions 75, the plate spring 751 and the operation tabs 752 are preferably made of a clear synthetic resin, the color and material thereof are not limited.

It should be noted that for the slider 7A shown in FIG. 4 and the slider 7B shown in FIG. 5, the clip body 74 or the sliding portion 75 can be held at a predetermined position by pinching and moving the tabs 741 or the operation tabs 752 to move the clip body 74 or the sliding portion 75 to the predetermined position and, subsequently, releasing the tabs 741 or the operation tabs 752.

Figure 6:
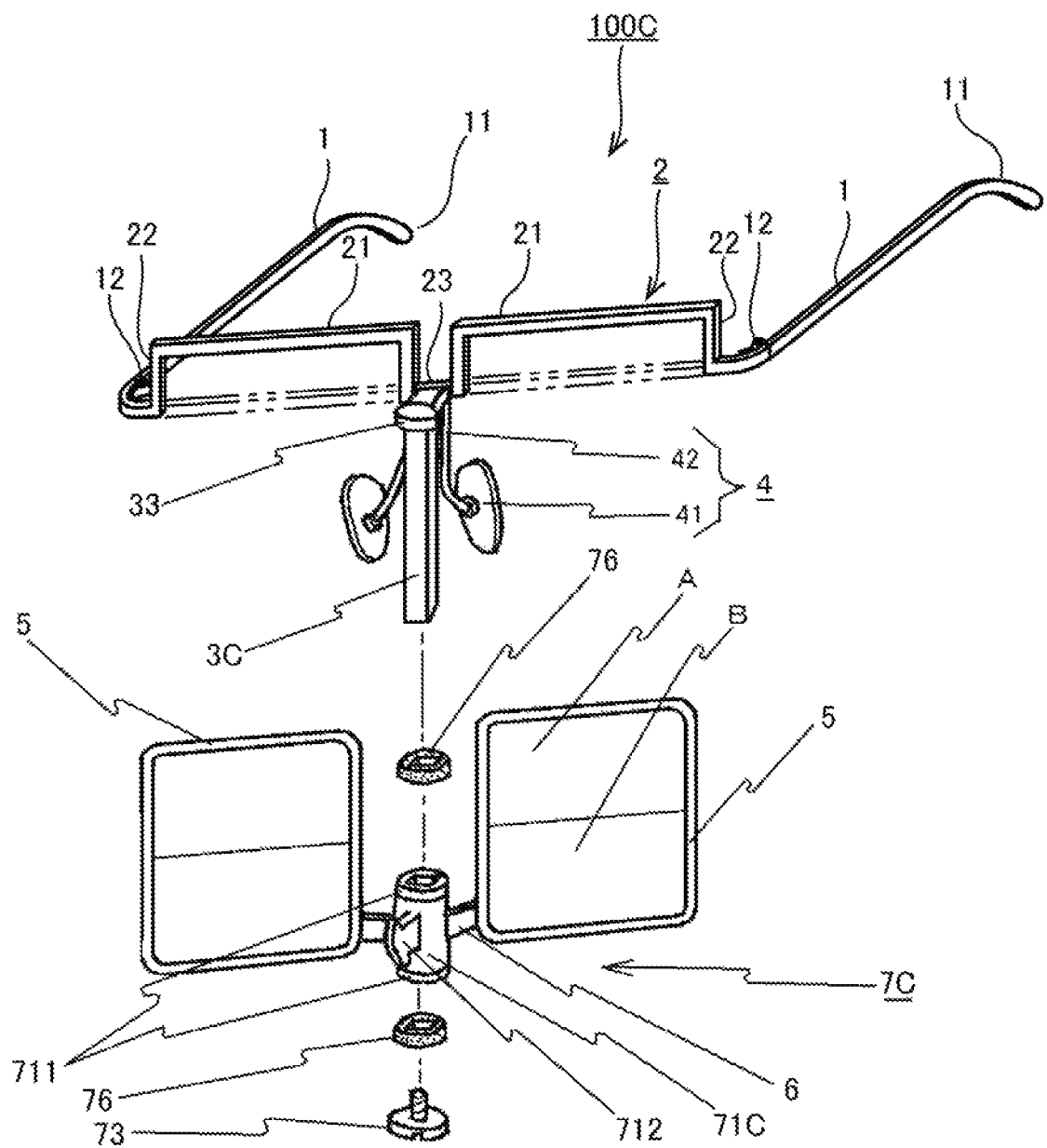
FIG. 6 is an exploded perspective view of a magnetic slider in use.

FIG. 6 is an exploded perspective view of an eyeglass-shaped frame 100C provided with a magnetic slider 7C. The slider 7C includes a slide bearing 71C made of a clear synthetic resin configured to receive a shaft 3C therein such that the slide bearing 51C is slidable along the shaft 3C, the antidrop member 73 provided to an end of the shaft 3C, magnets 76 configured to be attracted to respective upper and lower ends of the hanging shaft 3C, and sheet irons 711 attached to respective upper and lower ends of the slide bearing 71C. An integral handle 712 projects from a surface of the slide bearing 71C. It should be noted that although the slide bearing 71C is preferably made of a clear synthetic resin, the color and material thereof are not limited. It should also be noted that a fall stopper 33 is provided to the upper end of the shaft 3C.

Figure 7:
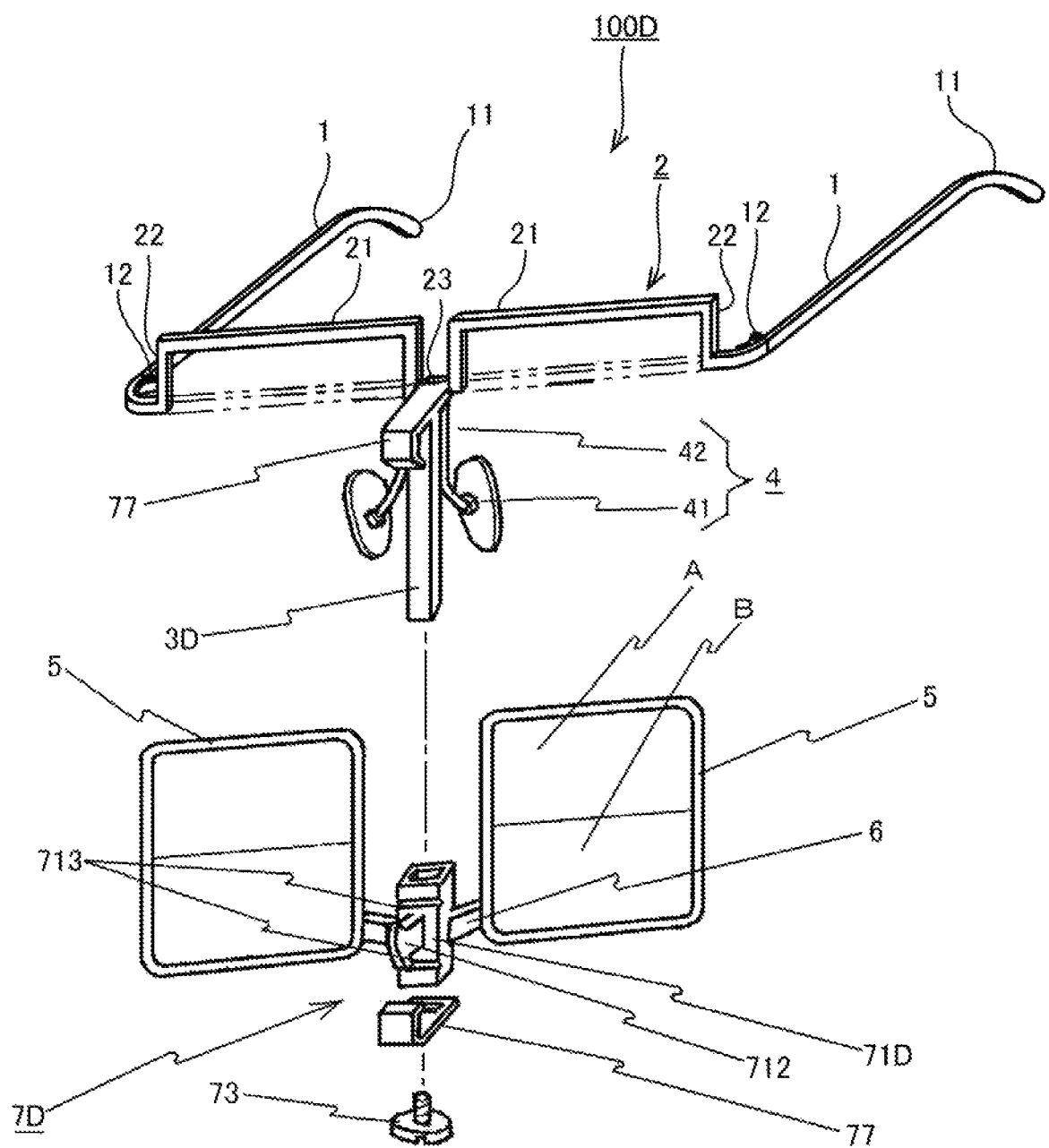
FIG. 7 is an exploded perspective view of a locking slider in use.

FIG. 7 is an exploded perspective view of an eyeglass-shaped frame 100D provided with a locking slider 7D. The slider 7D includes: a slide bearing 71D made of a clear synthetic resin configured to receive a shaft 3D therein such that the slide bearing 71D is slidable along the shaft 3D, two locking grooves 713 provided to a surface of the slide bearing 71D, locking pieces 77 configured to be engaged with the respective locking grooves 713 while being provided to upper and lower ends of the shaft 3D, and the antidrop member 73 provided to the end of the shaft 3D. A level difference between the respective locking pieces 77 locked in the upper and lower locking grooves 713 preferably corresponds to the distance between the respective centers of the lens A and the lens B. It should be noted that although the slide bearing 71D and the locking pieces 77 are preferably made of a clear synthetic resin, the color and material thereof are not limited. The locking piece 77 provided to the upper end of the shaft 3D may be integral with the hanging shaft 3D.

For the slider 7C shown in FIG. 6 or the slider 7D shown in FIG. 7, the slide bearing 71C or 71D can be held at a predetermined position by pinching the handle 712 of the slide bearing 71C or 71D with fingers and moving it upward and downward to hold the slide bearing 71C or 71D at a predetermined position for magnetic fixation or lock of the slide bearing 71C or 71D.

Figure 8A:
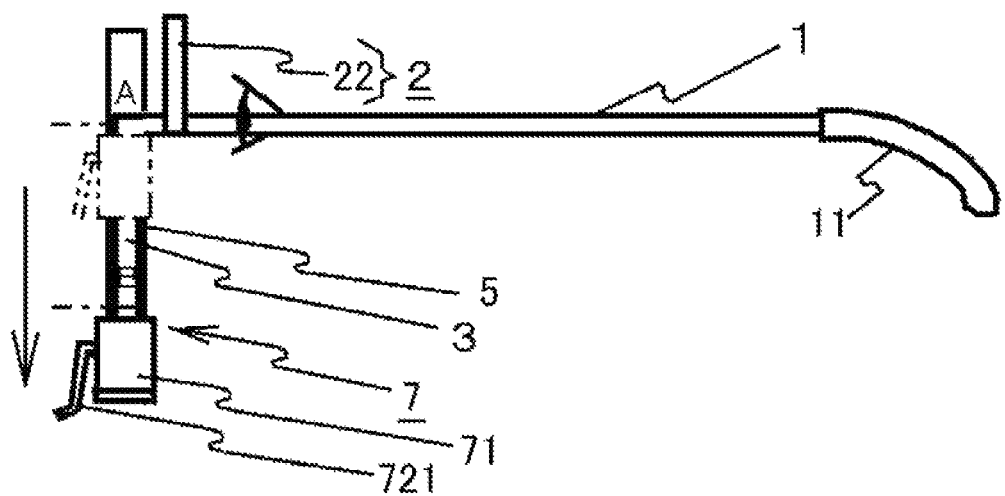
FIG. 8A illustrates an operation according to the exemplary embodiment.
Figure 8B:
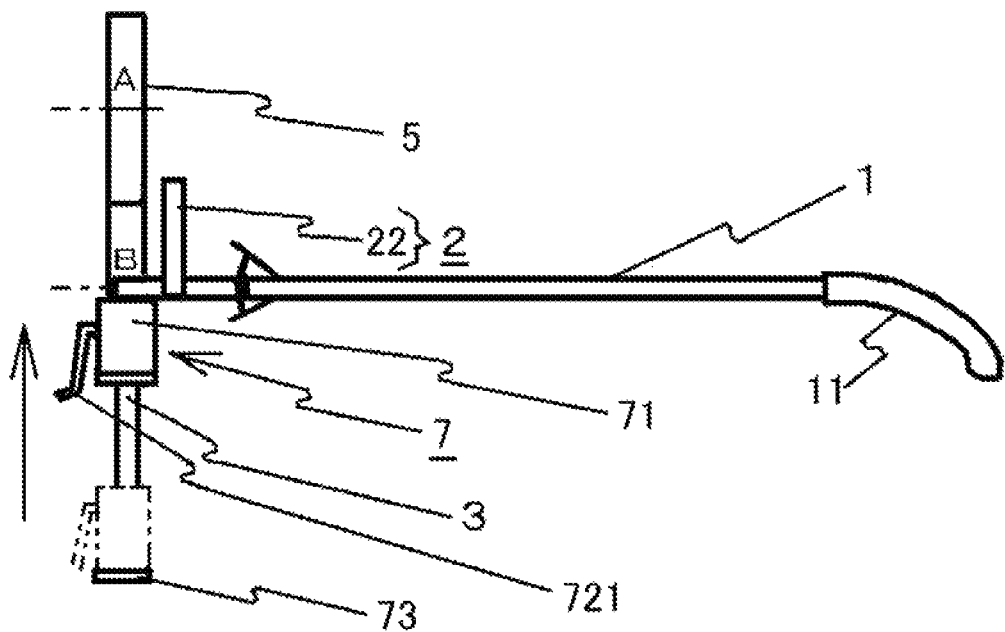
FIG. 8B illustrates another operation according to the exemplary embodiment.

Next, operations of the exemplary embodiment will be described with reference to FIG. 8A and FIG. 8B. First, a state of FIG. 8A will be described. When the user wears glasses in the state, the eye level of the user is aligned with the center of the lens A, so that the user can see an object very clearly and upper and lower sides of the lens A are effectively usable. In order to subsequently use the lens B, the engagement piece 721 is first pressed with a finger to disengage the engagement piece 721 and, subsequently, the slide bearing 71 is moved upward as shown by an arrow in FIG. 8B to bring the end of the engagement piece 721 into engagement with the upper engagement groove 31. The slide bearing 71 is thus stopped at a position shown in FIG. 8B and held without dropping. The center of the lens B is aligned with the eye level in this state in the same manner as when the lens A is used. The user can thus look straight at the object, so that eyestrain of the user is drastically reducible.

The holding frames 5 are vertically moved simply by vertically moving the slide bearing 71 as described above. In this regard, the slide is easily operable when configured to be held simply upon contact with the upper or lower end surface using, for instance, the clip body 74 shown in FIG. 4 or the sliding portion 75 shown in FIG. 5 without providing the engagement groove 31. In addition, only the lenses and relevant parts are vertically moved without the necessity of changing a positional relationship between the nose pads 4, the ear pieces 11, and the temples 1.

Further, for instance, when a concave lens is used as the lens A and a convex lens is used as the lens B, the following effects are obtainable. Specifically, 1) the user can be prevented from suffering a blurring forward vision or an incorrect feeling of distance due to out-of-focus eyes when looking at an object ahead immediately after operating devices, such as a car navigation device and an audio device, around a driver's seat. 2) When the user sitting in front of a computer visually checks data and characters at hand and then looks at the computer screen, the user can be prevented from feeling it difficult to look at small characters and feeling dazzled, resulting in a reduction in eyestrain, headache, stiff shoulder and the like. 3) The user can walk down stairs without a difficulty such as blurring vision around his/her foot sight, so that the user can be prevented from accidentally stepping off the stairs. 4) The user can read a newspaper or a magazine while watching a TV with less frequency of out-of-focus eyes. 5) During fishing in a rocky area, the user can walk around the rocky area with almost no risk of stumbling over a rock even immediately after putting a bait on a hook.

A sunglass may be used as the lens A while a convex lens may be used as the lens B. In this case, immediately after operating, in particular, a car navigation device, an audio device or the like around a driver's seat using the sunglass, the user can change the lens to the sunglass to look so as not to suffer a blurring forward vision or an inaccurate distance-feeling nor feel dazzled.

A wearable terminal glass may be used as the lens A while a convex lens may be used as the lens B. In this case, the user who wears the lens B as glasses can use the wearable terminal without taking off the glasses.

Thus, the frame in the first exemplary embodiment allows the two types of lenses A, B to be easily individually used without changing the glasses.

Second Exemplary Embodiment

Figure 9:
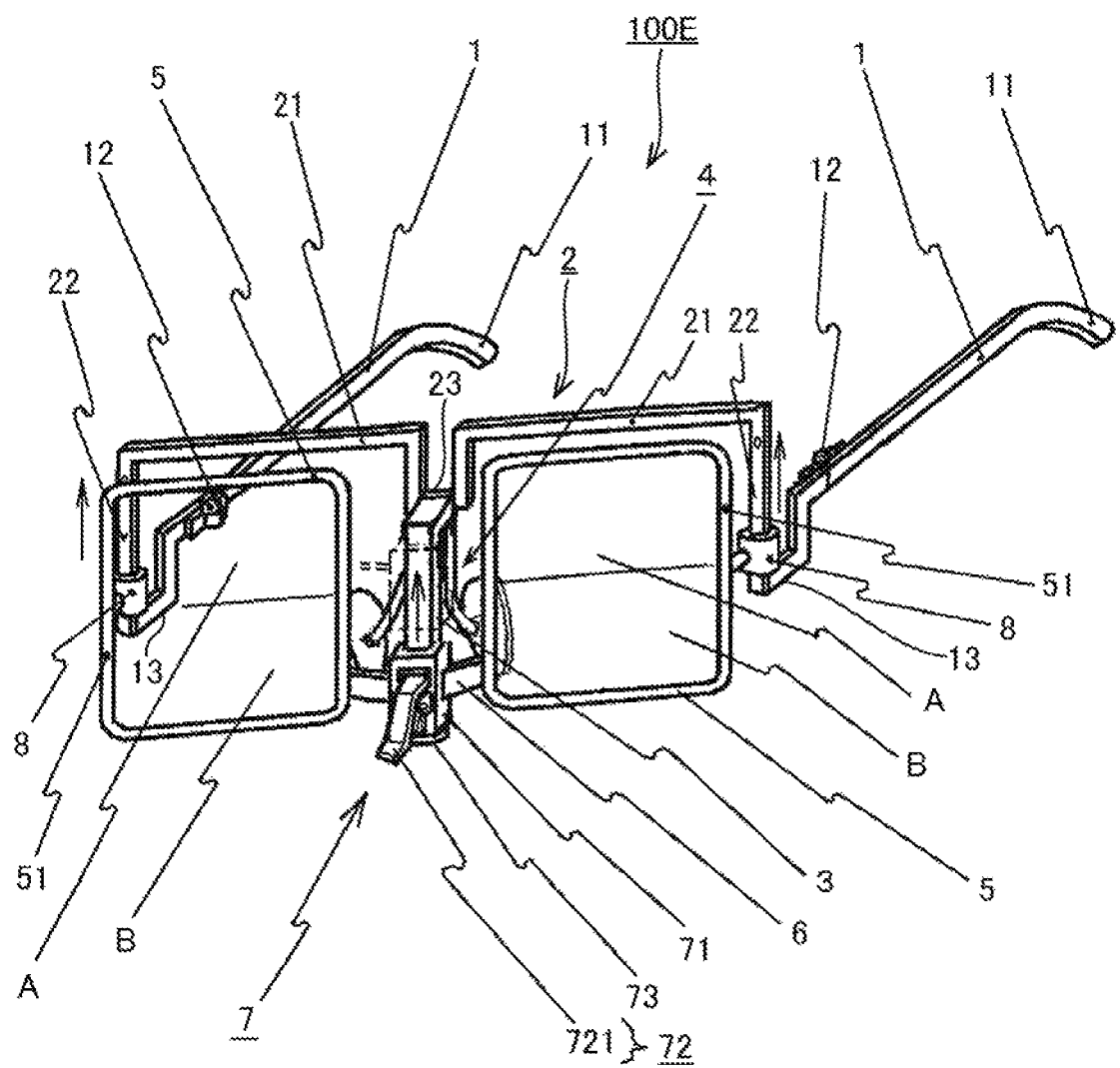
FIG. 9 is a perspective view of an eyeglass-shaped frame according to a second exemplary embodiment of the invention.

A second exemplary embodiment of the invention will be described with reference to FIG. 9.

An eyeglass-shaped frame 100E in the second exemplary embodiment is provided by modifying the eyeglass-shaped frame according to the first exemplary embodiment, in which a bent portion 13 is provided to the front end of each of the temples 1, the vertical portions 22 of the connecting bar 2 are prolonged, and guides 8 for smoothly vertically moving the holding frames 5 are provided to the respective holding frames 5.

The bent portion 13 of each of the temples 1 is close to the connecting bar 2 with respect to the hinge 12 such that the bent portion 13 is a downward dent when viewed in a direction from the hinge 12 toward the connecting bar 2. A front end of the bent portion 13 is connected to the bent portion 22 of the connecting bar 2.

The connecting bar 2 is arranged such that the vertical portions 22 face outer frames 51 of the respective holding frames 5 and each of the vertical portions 22 is elongated beyond the center of the holding frames 5 (i.e., a border between the lens A and the lens B). The temples 1 are connected to the connecting bar 2 such that the temples 1 are at the same height as the center of the lens A or the center of the lens B.

Figure 10:
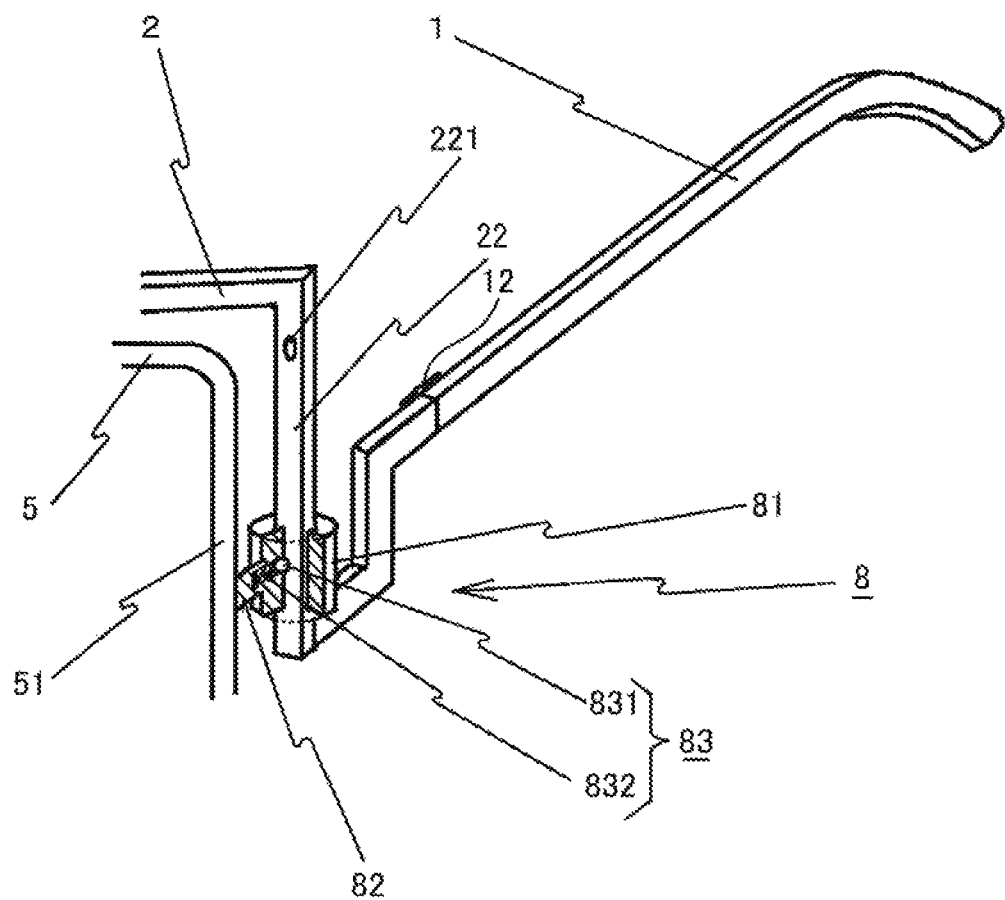
FIG. 10 is a perspective view of a guide.

The guides 8 each have a female structure. The guides 8 are respectively interposed between the vertical portions 22 of the connecting bar 2 and the outer frames 51 of the holding frames 5 and are configured to guide the holding frames 5 along the respective vertical portions 22. As shown in FIG. 10, each of the guides 8 includes: a vertically movable slide ring 81 that receives therein each of the vertical portions 22 of the connecting bar 2; a connection bar 82 that connects the slide ring 81 to the corresponding one of the outer frames 51 of the holding frames 5; and a stopper 83 configured to keep the slide ring 81 stopped at an upper part of each of the vertical portions 22. A hole in a shape corresponding to a shape of each of the vertical portions 22 penetrates the center of the slide ring 81. The stopper 83 includes a sphere 831 that is pressed to be in contact with an outer surface of each of the vertical portions 22, and a spring 832 that applies a pressing force to the sphere 831 (see FIG. 10). A hole 221 with which an end of the sphere 831 is engageable is made in an upper part of the outer surface of each of the vertical portions 22. It should be noted that the stopper 83 is not necessarily provided. Specifically, since the holding frames 5 are held by the holder 72 of the slider 7 so as not to move downward, the slide ring 81 can be prevented from moving downward even if the stopper 83 is not provided. Alternatively, when the stopper 83 is provided, the holder 72 of the slider 7 is omittable.

Figure 11:
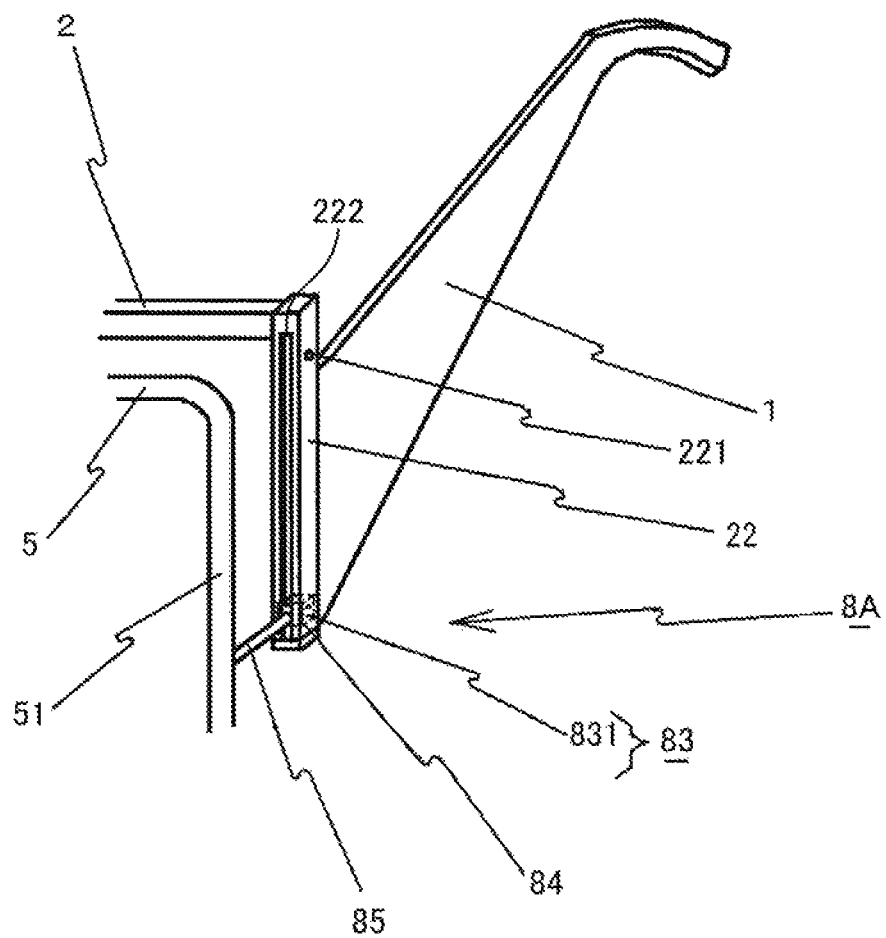
FIG. 11 is a perspective view of another guide.

FIG. 11 is a perspective view of one of male guides 8A. Each of the vertical portions 22 of the guides 8A is in advance shaped in a box and formed with a slit 222 on the front thereof. Each of the guides 8A includes: a piece 84 that is vertically movable in and along an interior of each of the vertical portions 22; a connection bar 85 that connects the piece 84 to the corresponding one of the outer frames 51 of the holding frames 5; and a stopper 83 configured to keep the piece 84 locked at the upper part of each of the vertical portions 22. The piece 84 is shaped in a cuboid or a cube. The stopper 83 may be the same one used for the guides 8, but any differently structured stoppers are usable.

When the guides 8A are used, the temples 1 may be formed in substantially triangular plate as shown in FIG. 11. Although the material of the temples 1 in this arrangement is preferably a synthetic resin, other materials are usable. Similarly, also when the guides 8 are used, the temples 1 may be formed in substantially triangular plate.

The second exemplary embodiment can achieve the same advantages as those of the first exemplary embodiment.

Moreover, since the guides 8, 8A are provided, wiggling of the holding frames 5 can be reduced, so that the holding frames 5 can be vertically moved in a smooth manner.

Third Exemplary Embodiment

Figure 12:
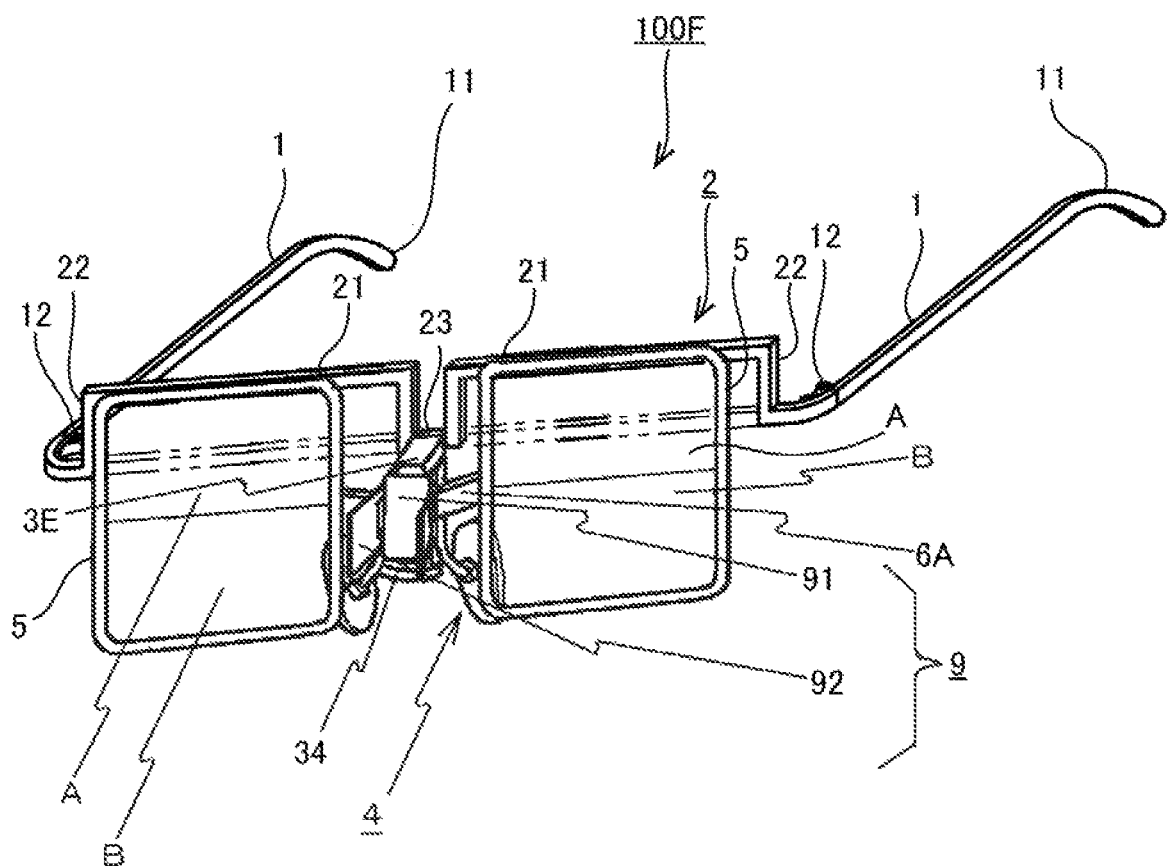
FIG. 12 is a perspective view of an eyeglass-shaped frame according to a third exemplary embodiment of the invention.

A third exemplary embodiment will be described with reference to FIGS. 12 and 13.

Figure 13:
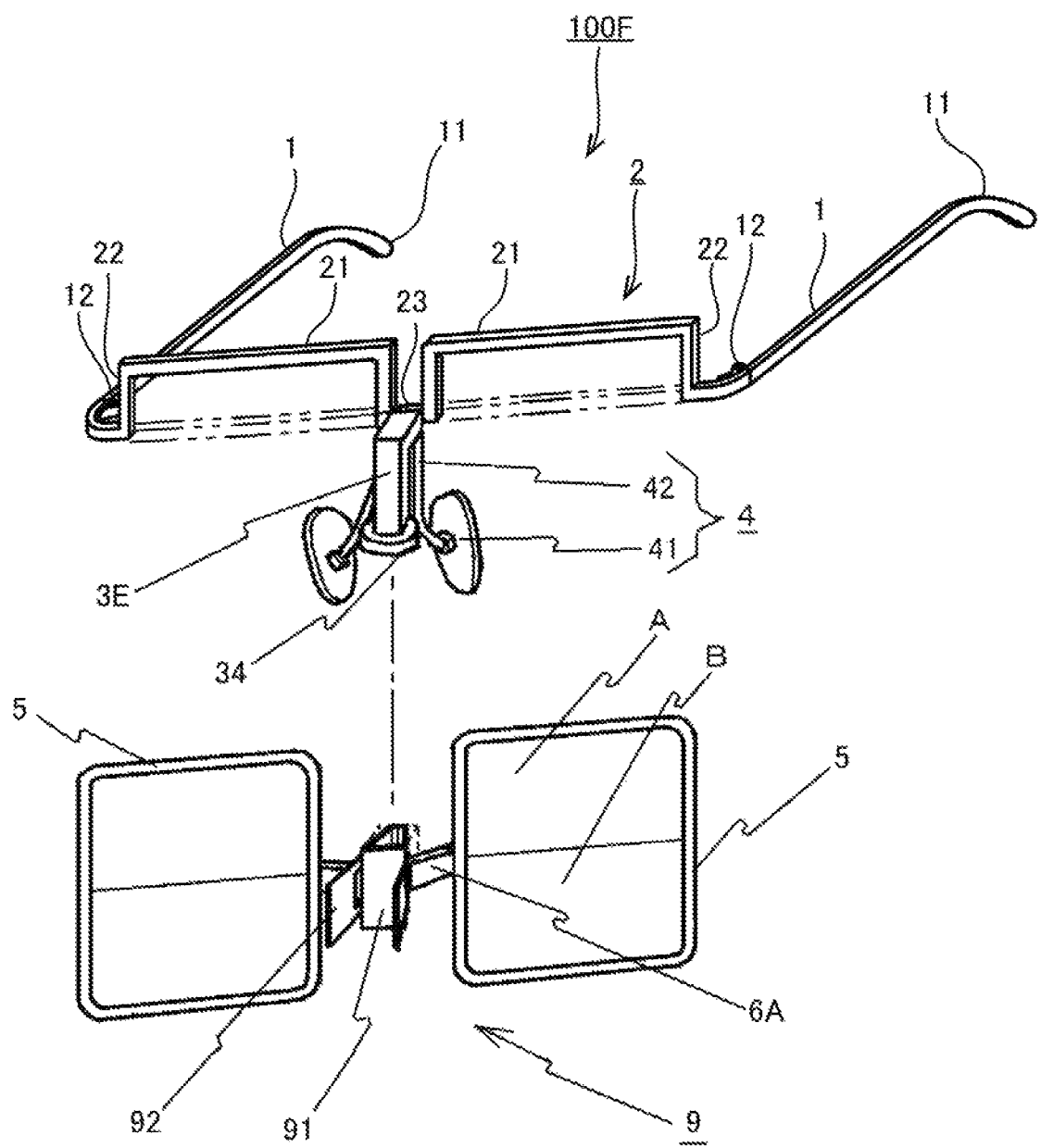
FIG. 13 is an exploded perspective view of the eyeglass-shaped frame in FIG. 12.
Figure 16A:
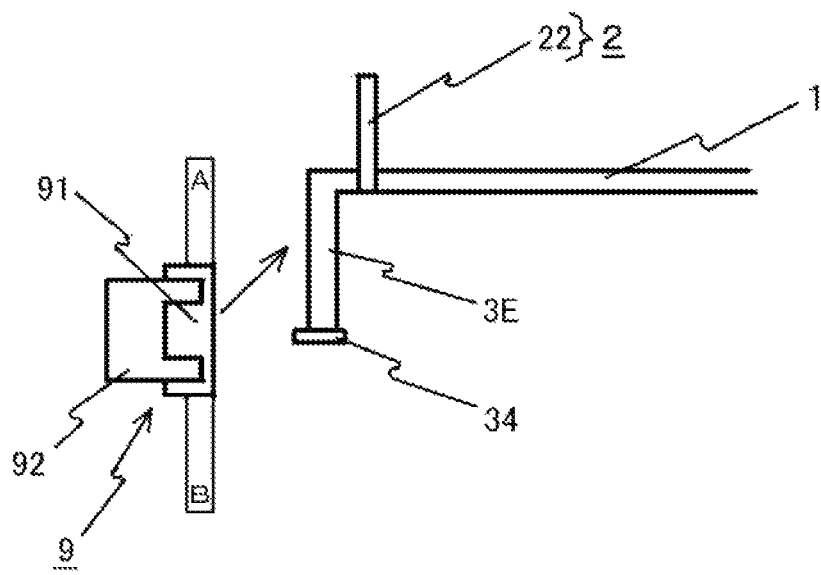
FIG. 16A illustrates an operation according to the exemplary embodiment.

In an eyeglass-shaped frame 100F of the third exemplary embodiment, a shaft 3E, which hangs in the form of a polygonal column (e.g., square column), projects slightly forward with respect to the connecting bar 2 (see FIGS. 13 and 16A). Additionally, a flange-shaped antidrop member 34 is formed integrally with a lower end of the shaft 3E. It should be noted that the upper end of the support bar 42 may be fixed to the connecting bar 2 instead of being fixed to the shaft 3E.

A clip member 9 allows the holding frames 5 to be detachable from the shaft 3E. The clip member 9 includes: a clip body 91 with a resilience enough to hold the shaft 3E; and tabs 92 for opening an end of the clip body 91. The clip body 91 is formed from a plate spring of a clear synthetic resin into a triangle and has an openable end corresponding to an apex of the triangle. An end of each tab 92 is located on an edge of the opening of the clip body 91. The tabs 92, which are made of a clear synthetic resin, are configured to open the clip body 91 so that the clip body 91 holds the shaft 3E. It should be noted that the materials of the clip body 91 and the tabs 92 are not limited to a clear synthetic resin, but any colors and materials are selectable that do not block the field of vision. The clip body 91 and the tabs 92 are structurally substantially the same as a typical double clip used as stationery.

A bridge 6A is attached at a position as high as a middle of each holding frame 5. Additionally, the clip body 91 of the clip member 9 is fixed to a middle of the bridge 6A.

Figure 14:
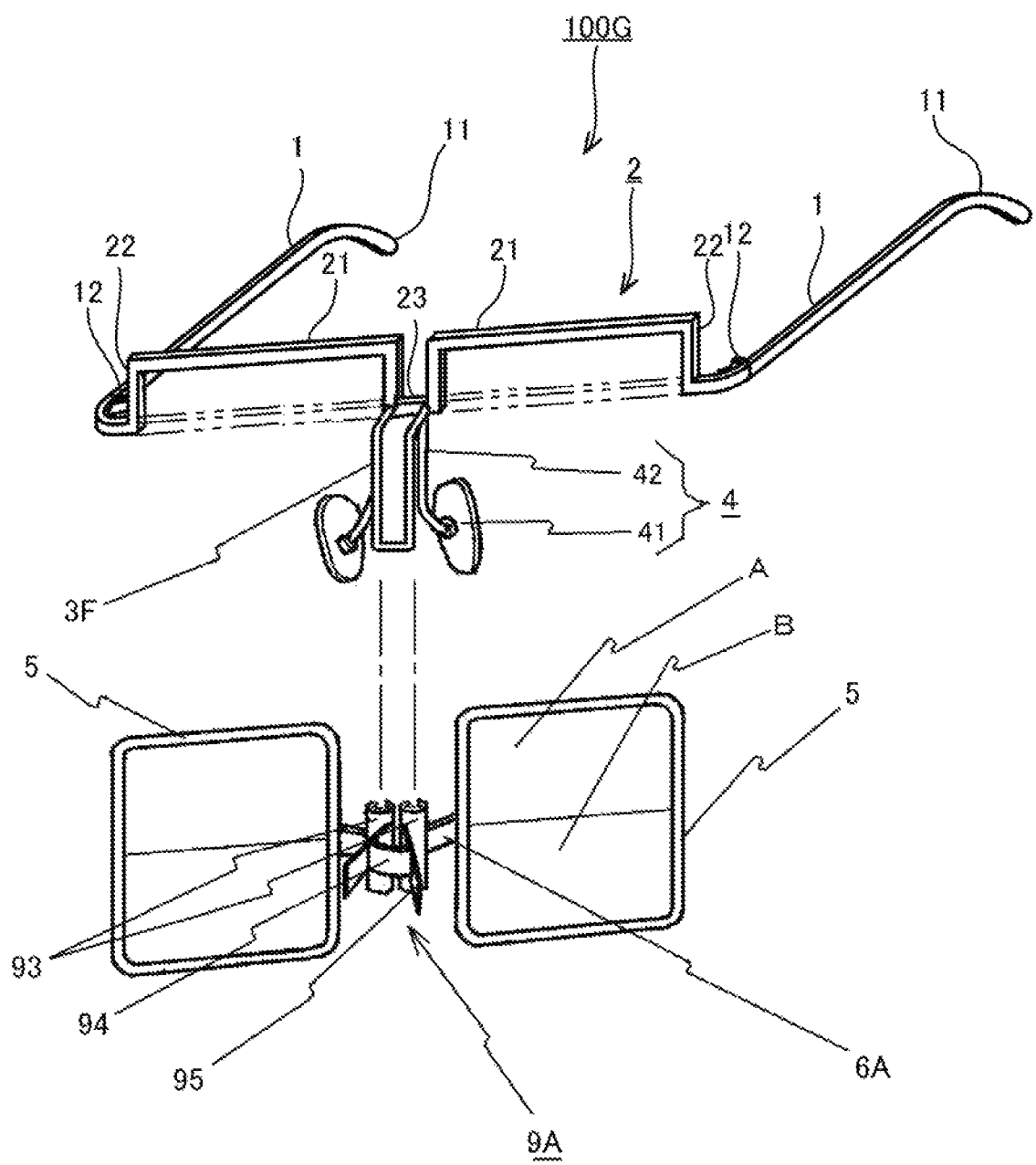
FIG. 14 is an exploded perspective view of a clip member in use, which is different from one in FIG. 12.

FIG. 14 is an exploded perspective view of an eyeglass-shaped frame 100G provided with a clip member 9A having another arrangement. In this arrangement, a shaft 3F is formed of a wire rod into a U-shape. The clip member 9A includes: a pair of insertion portions 93 of a clear synthetic resin configured to receive the shaft 3F therein, a substantially triangular plate spring 94 made of a clear synthetic resin with ends each fixed to corresponding one of the insertion portions 93, and operation tabs 95 made of a clear synthetic resin for opening the plate spring 94 to increase a distance between the insertion portions 93. Although the insertion portions 93, the plate spring 94, and the operation tabs 95 are preferably made of a clear synthetic resin, any colors and materials are selectable that do not block the field of vision.

Figure 15:
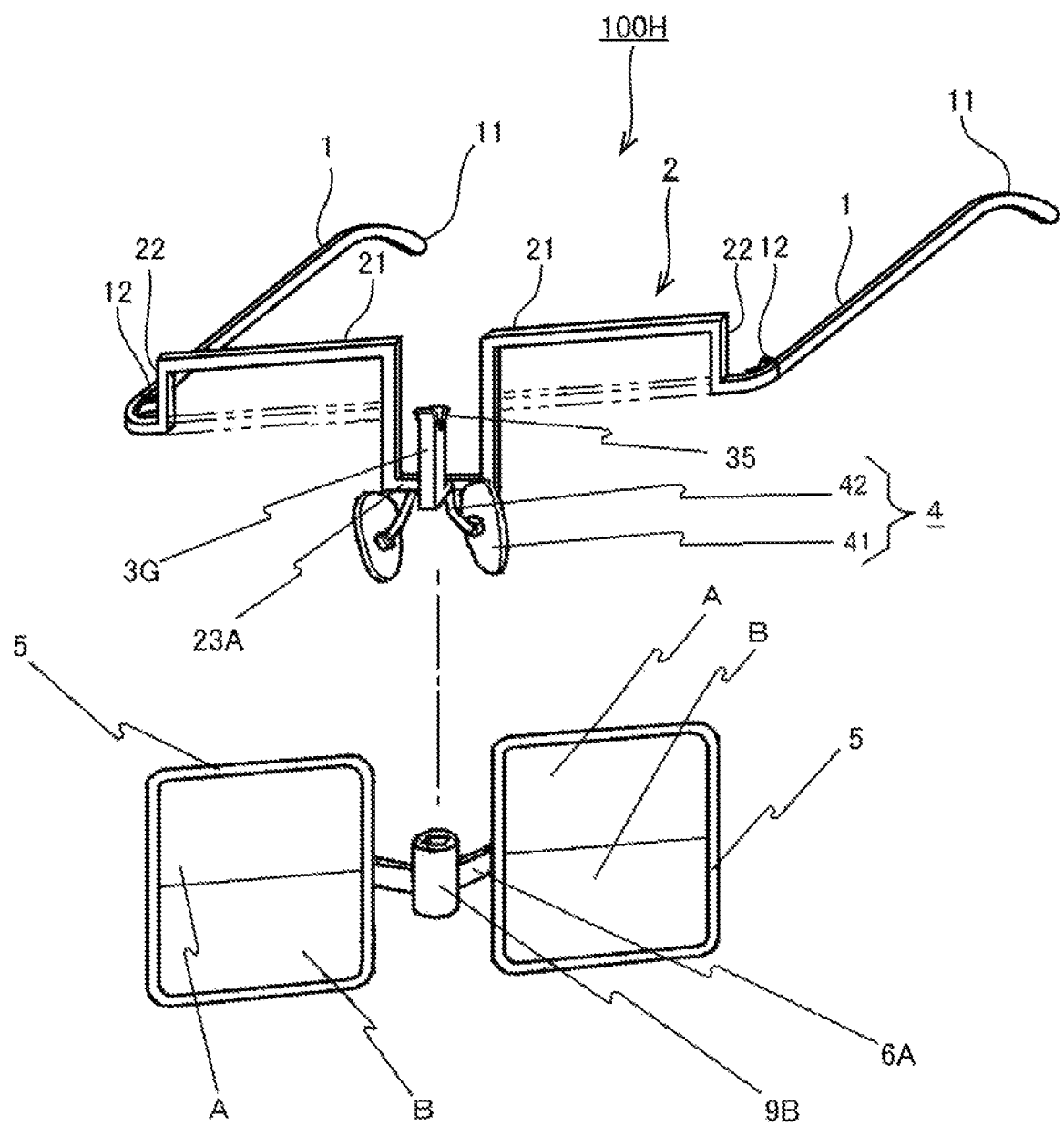
FIG. 15 is an exploded perspective view of a bearing in use in place of the clip member shown in FIG. 12.

FIG. 15 is an exploded perspective view of an eyeglass-shaped frame 100H provided with a bearing 9B in place of the clip member 9, 9A. In this arrangement, a stepped portion 23A of the connecting bar 2 is provided at a position lower than a level of the temples 1. A shaft 3G made of a clear synthetic resin in place of the hanging shaft 3E stands upward from the stepped portion 23A. In addition, the clip member 9, 9A is replaced by a bearing 9B of a clear synthetic resin configured receive the shaft 3G therein. The bearing 9B is fixed at the middle of the bridge 7A while being formed integrally between the pair of lens-holding frames 5. This arrangement allows the holding frames 5 to be vertically inverted by removing the bearing 9B from the shaft 3G and inserting, after the holding frames 5 are vertically inverted, the shaft 3G into the bearing 9B. A resilient slotted portion 35 is provided to an end of the shaft 3G. The slotted portion 35 is configured to prevent detachment of the shaft 3G from the bearing 9B after the insertion of the shaft 3G. The shaft 3G is preferably in the form of a polygonal column (e.g., square column) but may be in any other form (e.g., elliptic cylinder) as long as the shaft 3G is not rotatable.

Operations and advantages in the third exemplary embodiment will be described below with reference to FIGS. 16A to 16C. Firstly, a state shown in FIG. 16A will be described. The lens A is held in an upper side of each holding frame 5 and the lens B is held in a lower side. The clip member 9 is attached between the holding frames 5 via the bridge 6A (see FIG. 13). First, the clip body 91 is widely opened by pressing the tabs 92 with fingers, and then moved in an arrow direction in FIG. 13A to hold the shaft 3E. At this time, the clip body 91 is released from the fingers after it is checked whether upper and lower ends of the clip body 91 are unintentionally located on the antidrop member 34 and/or a top of the shaft 3E and whether the clip body 91 holds the shaft 3E at a predetermined position. The holding frames 5 are thus mounted on the shaft 3E. At this time, the clip body 91 continues to exert a holding force on the shaft 3E.

Figure 16B:
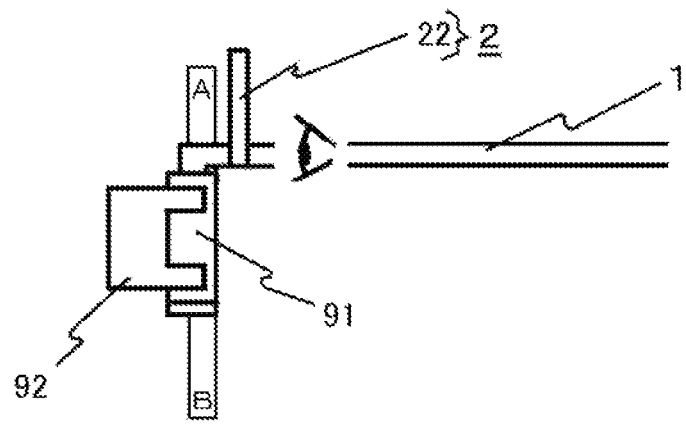
FIG. 16B illustrates another operation according to the exemplary embodiment.
Figure 16C:
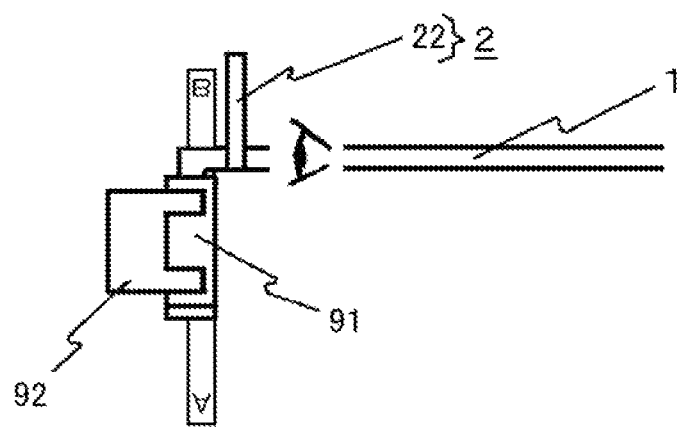
FIG. 16C illustrates still another operation according to the exemplary embodiment.

FIG. 16B shows that the glasses in the above state are worn. At this time, the eye level of the user is aligned with the center of the lens A, so that the user can see an object very clearly and upper and lower sides of the lens A are effectively usable. In order to subsequently use the lens B, the tabs 92 are first pressed with fingers to widely open the clip body 91 for detachment from the shaft 3E. After the holding frames 5 are vertically inverted, the clip body 91 is attached on the shaft 3E to hold the shaft 3E and the tabs 92 are then released from the fingers. The clip body 91 continues to exert a holding force on the shaft 3E at a position shown in FIG. 16C. The center of the lens B is aligned with the eye level in this state in the same manner as when the lens A is used. The user can thus look straight at the object and display information, so that eyestrain of the user is drastically reducible.

Next, operations and advantages of the bearing 9B shown in FIG. 15 will be described. First, for instance, a user wears the glasses in the state for the use of the lens A as shown in FIG. 16B. Since the eye level is aligned with the center of the lens A in the same manner as the above, the user can see an object very clearly while the upper and lower sides of the lens A are effectively usable. In order to subsequently use the lens B, the slotted portion 35 of the shaft 3G shown in FIG. 15 is first pinched with fingers to be thinned, while the bearing 9B is pinched with fingers of the other hand and moved upward to be removed from the shaft 3G. After the holding frames 5 are vertically inverted, the end of the shaft 3G only needs to be inserted into the bearing 9B. At this time, when the end of the shaft 3G is inserted into the bearing 9B, a space between ends of the slotted portion 35 is eliminated. As the shaft 3G is further inserted through the bearing 9B, a resilience of the slotted portion 35 restores the space, making the ends of the slotted portion 35 spaced from each other. This prevents detachment of the bearing 9B from the shaft 3G.

With a simple operation merely by removing the holding frames 5 from the shaft 3E, 3F or 3G and then attaching the holding frames 5 having been vertically inverted as described above, the different types of lenses (i.e., the lenses A, B) can be switched in accordance with an intended use through the vertical inversion of the lenses A, B.

It should be noted that merely a single pair of lenses may be held in the holding frames 5 and replaced as needed, instead of the different types of lenses A, B being held in the upper and lower sides. For instance, two or more types of glasses, such as a pair of convex lenses and a pair of sunglasses, may be prepared and replaced with each other in accordance with an intended use.

The third exemplary embodiment can achieve the same advantages as those of the first exemplary embodiment.

Fourth Exemplary Embodiment

Figure 17:
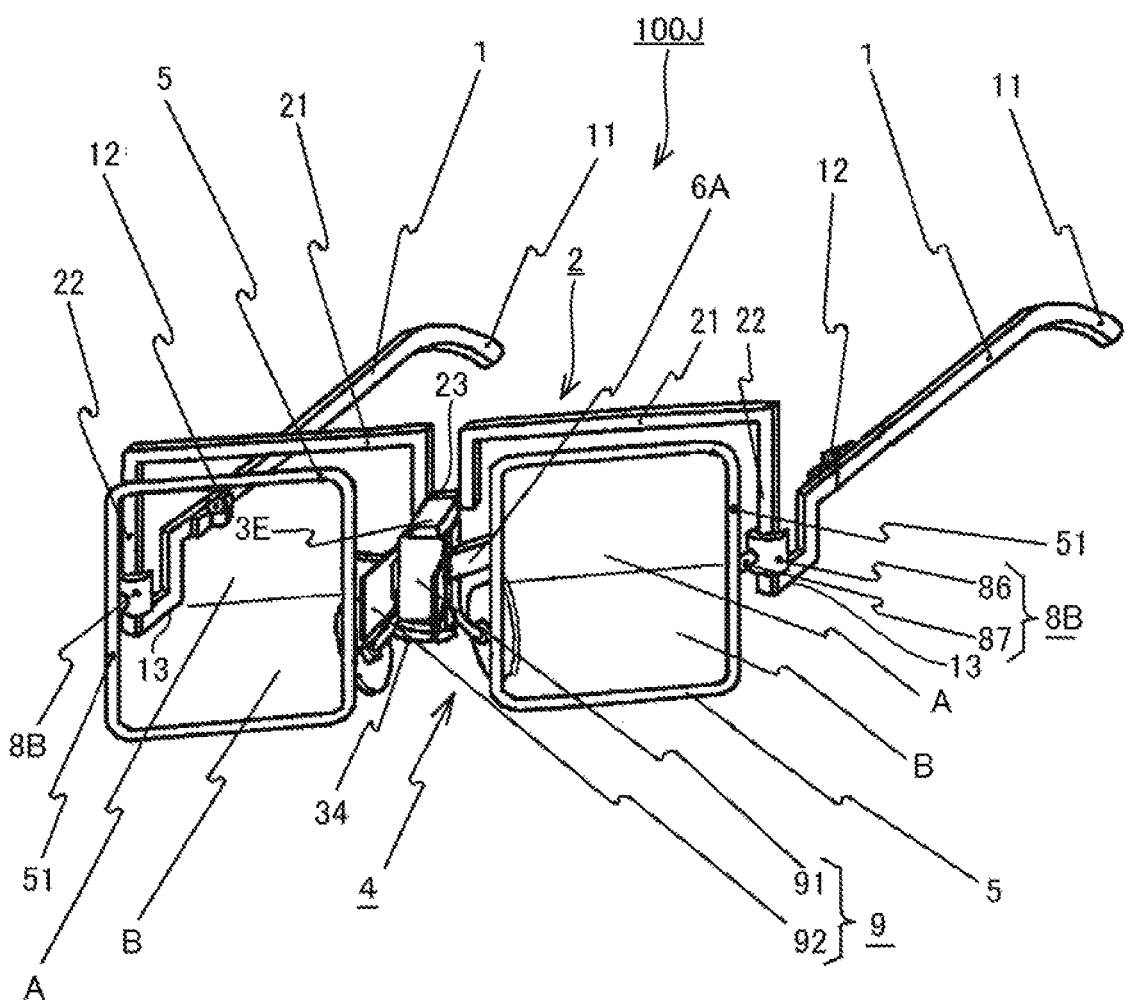
FIG. 17 is a perspective view of an eyeglass-shaped frame according to a fourth exemplary embodiment of the invention.

A fourth exemplary embodiment of the invention will be described with reference to FIG. 17.

An eyeglass-shaped frame 100J in the fourth exemplary embodiment is provided by modifying the eyeglass-shaped frame according to the third exemplary embodiment, in which the bent portion 13 is provided to the front end of each of the temples 1 and the vertical portions 22 of the connecting bar 2 are elongated in the same manner as in the second wiggling, and guides 8B for reducing wiggling of the holding frames 5 are provided to the respective holding frames 5.

The guides 8B are respectively interposed between the vertical portions 22 of the connecting bar 2 and the outer frames 51 of the holding frames 5 to hold the holding frames 5 relative to the vertical portions 22. The guides 8B each include: a clip piece 86 holding each vertical portion 22 of the connecting bar 2; and a connection bar 87 connecting the clip piece 86 and each of the outer frames 51 of the holding frames 5. The clip piece 86 is formed of a resilient material (e.g., rubber and resin) into a C shape.

Figure 18:
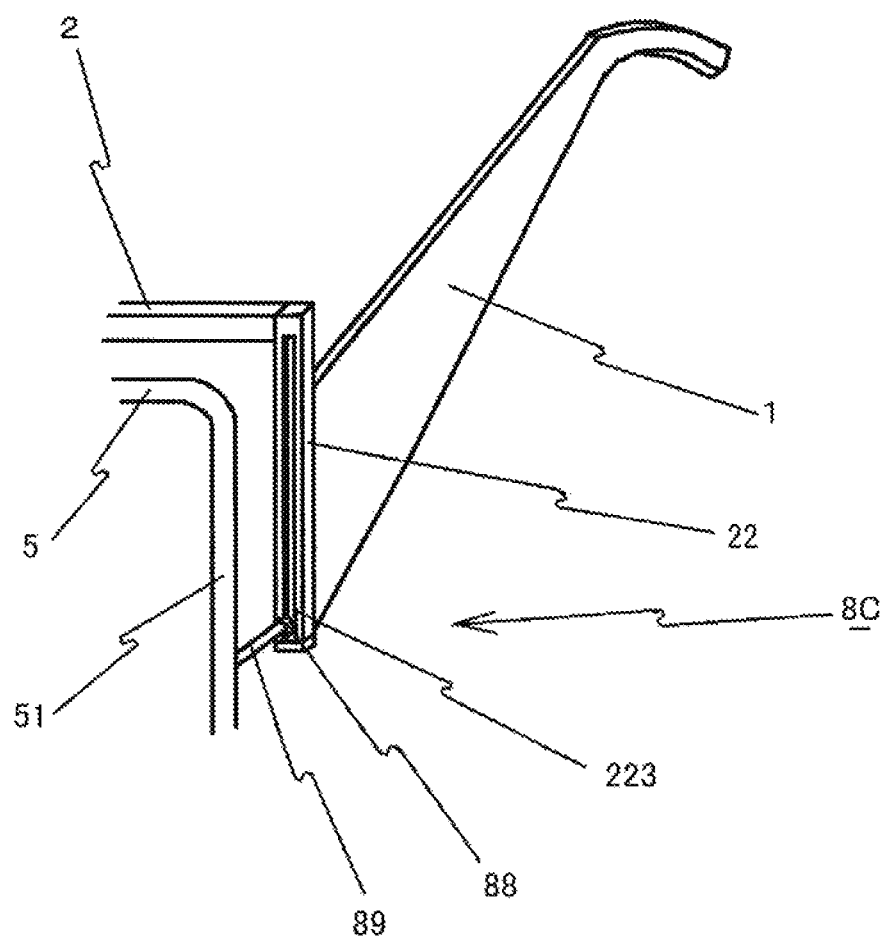
FIG. 18 is a perspective view of another guide.

The guides 8B, which is not structurally limited to the above, may be exemplified by guides 8C shown in FIG. 18 in which the clip piece 86 is replaced by an insertion piece 88 and the insertion piece 88 is inserted in an elongated hole 223 made on each vertical portion 22. A connection bar 89 in this arrangement is preferably formed of a resilient member such as a resilient synthetic resin.

When the guides 8C are used, the temples 1 may be formed in substantially triangular plate as shown in FIG. 18. Although the material of the temples 1 in this arrangement is preferably a synthetic resin, other materials are usable. Similarly, also when the guides 8B are used, the temples 1 may be formed in substantially triangular plate.

The fourth exemplary embodiment can achieve the same advantages as those of the third exemplary embodiment.

Moreover, since the guides 8B, 8C are provided, wiggling of the holding frames 5 is reducible.

Fifth Exemplary Embodiment

Figure 19:
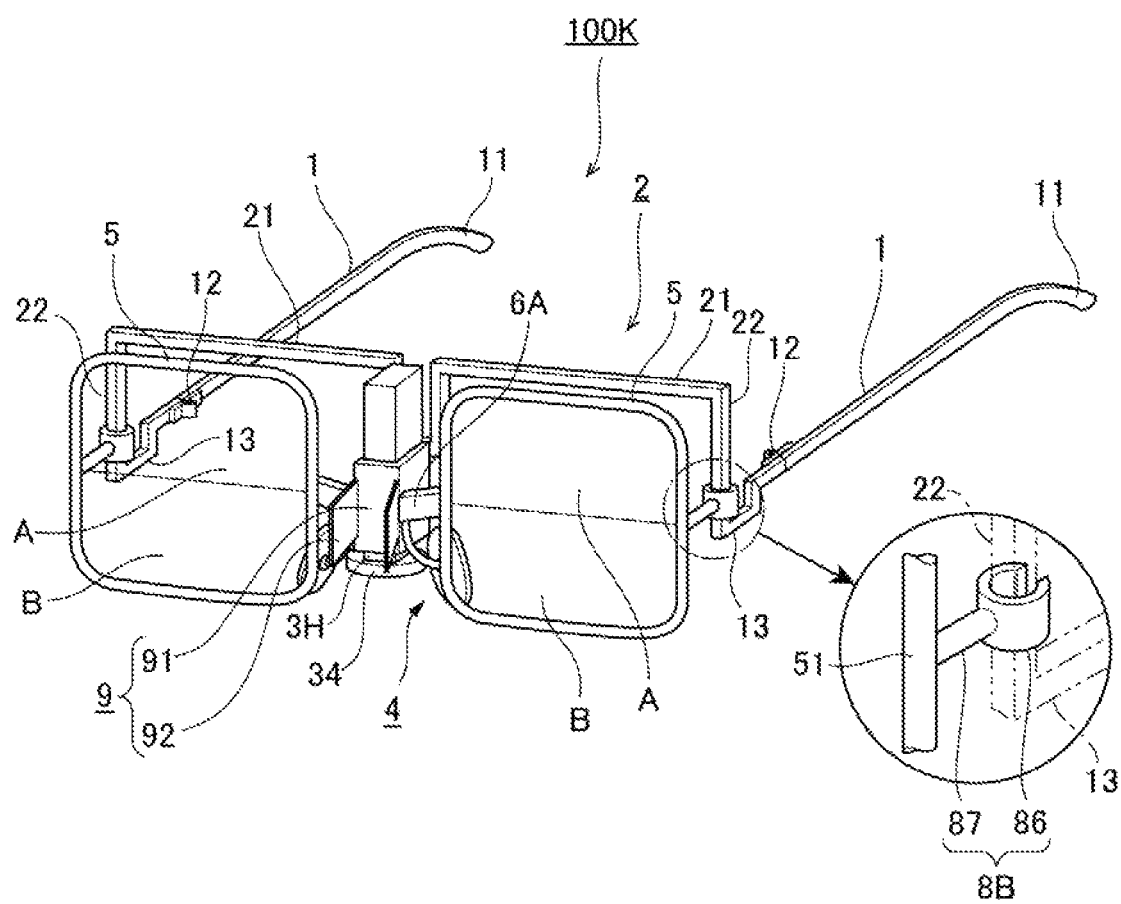
FIG. 19 is a perspective view of an eyeglass-shaped frame according to a fifth exemplary embodiment of the invention.

A fifth exemplary embodiment of the invention will be described with reference to FIG. 19.

An eyeglass-shaped frame 100K in the fifth exemplary embodiment is provided by modifying the eyeglass-shaped frame according to the fourth exemplary embodiment, in which the shaft 3E (see FIG. 17) is extended upward to provide a shaft 3H and the clip member 9 is slidable along the shaft 3H.

The clip member 9 is supported by the shaft 3H so as to be vertically slidable. In other words, the clip member 9 also serves as a slider.

The fifth exemplary embodiment can achieve the same advantages as those of the first exemplary embodiment to the fourth exemplary embodiment.

For instance, the center of either the lens A or B can be aligned with the eye level by removing the clip body 91 from the shaft 3H, and again attaching the clip body 91 on the shaft 3H after the holding frames 5 are vertically inverted.

Furthermore, the holding frames 5 can be vertically moved by vertically moving the clip member 9, aligning the center of either the lens A or B with the eye level.

It should be noted that the invention is not limited to the above exemplary embodiments but may include modifications, improvements and the like as long as an object of the invention is achievable.

Figure 20:
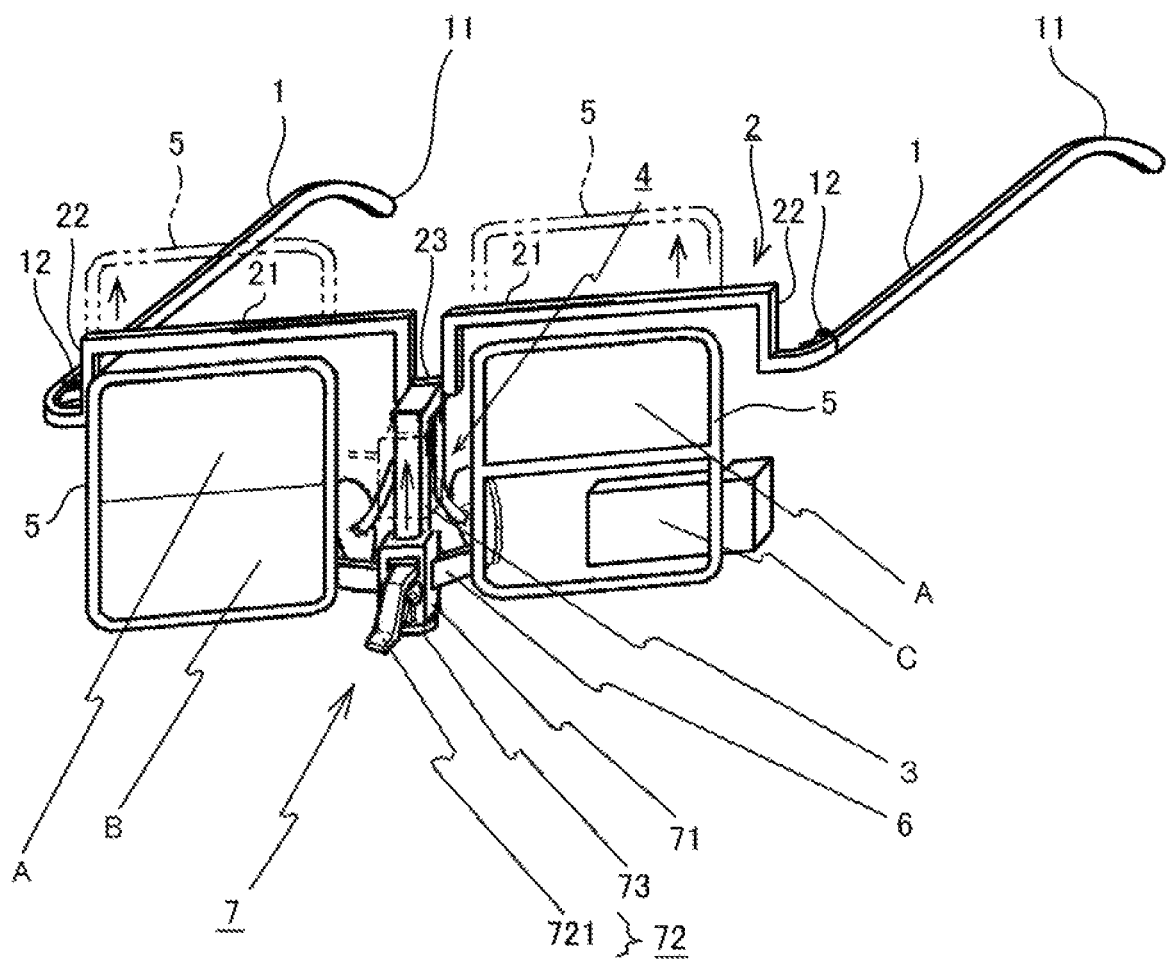
FIG. 20 is a perspective view of an eyeglass-shaped frame according to a modification of the invention.

For instance, the holding frames 5 may hold a display C instead of the lenses A, B or in combination with the lenses A, B as shown in FIG. 20. The display C includes an optical device, such as a prism, a mirror, a semitransparent mirror, or a hologram device, and a projector configured to project an image. A transmissive (see-through) display, a non-transmissive (non-see-through) display, a retinal-scanning display, a retinal-projection display, and the like are usable as the display C. The transmissive display C and the non-transmissive display C are each configured to display an image projected by the projector such as a liquid crystal panel and an organic EL (Electro-Luminescence) panel. The retinal-scanning display C and the retinal-projection display C are each configured to project, for instance, a laser beam onto a retina.

Figure 21:
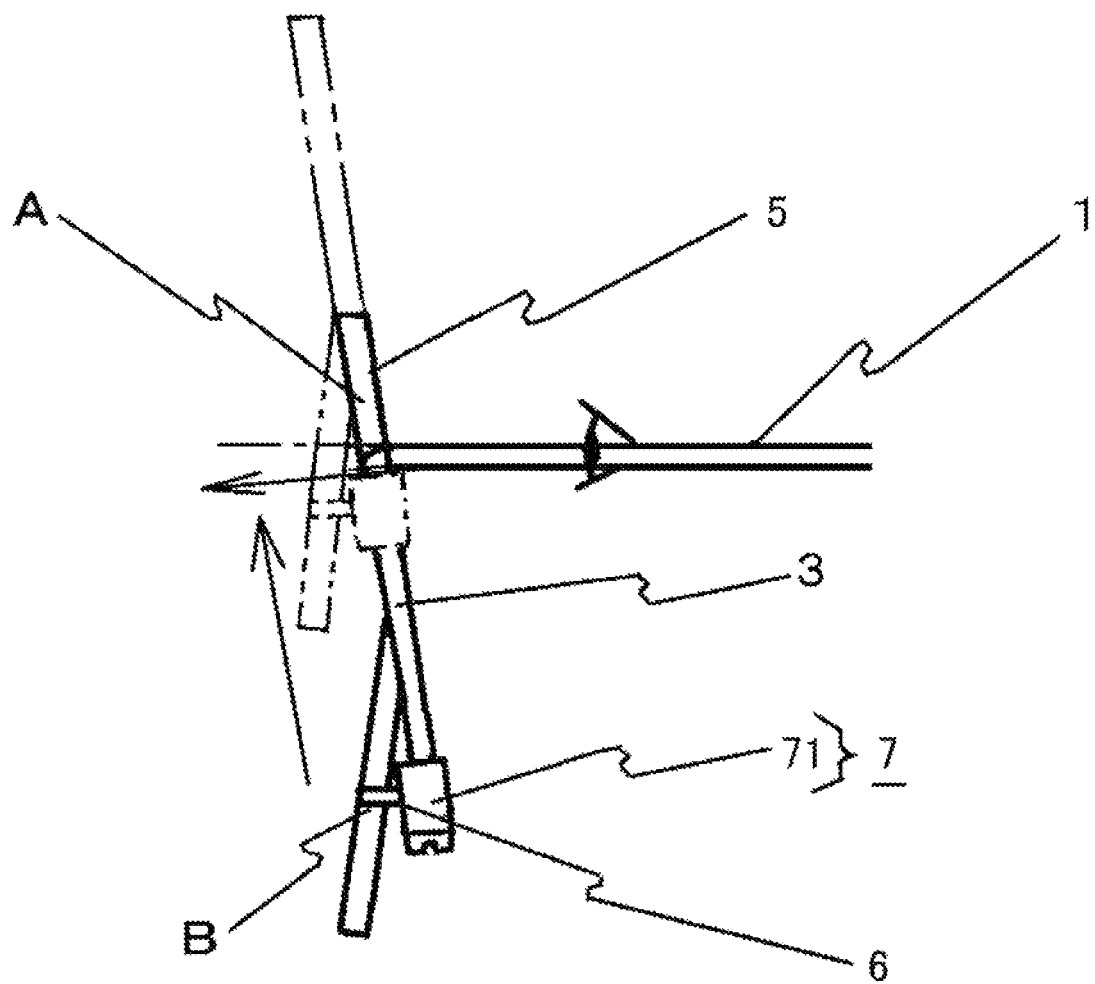
FIG. 21 illustrates a bent lens-holding frame.
Figure 22A:
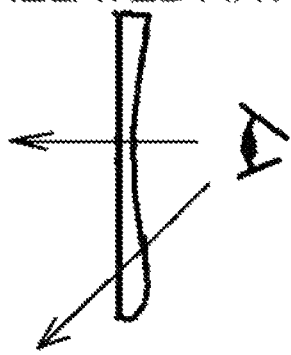
FIG. 22A illustrates eye directions through a conventional pair of glasses.
Figure 22B:
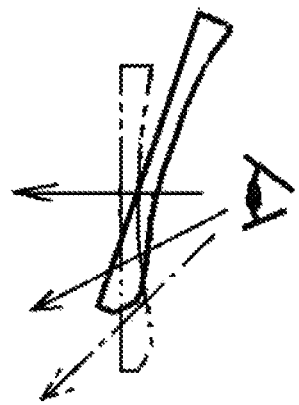
FIG. 22B illustrates eye directions through the conventional pair of glasses.
Figure 22C:
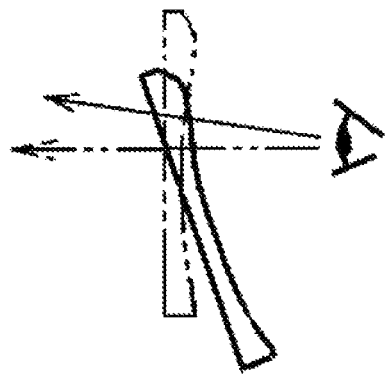
FIG. 22C illustrates eye directions through the conventional pair of glasses.

The holding frames 5 may be bent (inclined) as shown in FIG. 21 such that the lenses A and B are inclined. In this regard, a maximum level difference between each temple 1 and the bridge 6 may correspond to the distance between the respective centers of the lens A and the lens B, while the shaft 3 may be attached to the connecting bar 2 with an inclination so as to be translatable in accordance with an inclination of respective upper portions of the holding frames 5 or, alternatively, may be attached at a right angle. It should be noted that a chain line in FIG. 21 shows an eye level of a user.

The invention claimed is:

1. An eyeglass-shaped frame comprising:
a pair of temples;
a connecting bar connecting respective ends of the pair of temples;
at least one shaft hanging from a middle of the connecting bar;
nose pads fixed to the shaft;
a pair of holding frames each configured to hold vertically arranged optical members;
a bridge connecting the pair of holding frames; and
a slider configured to allow the holding frames to vertically slide in front of the connecting bar, wherein
the bridge is attached at a position lower than a center of a lower one of the optical members in each of the holding frames, and
the holding frames are slidable for a distance at least corresponding to a distance between a center of an upper one and the center of the lower one of the optical members.

2. The eyeglass-shaped frame according to claim 1, wherein the optical members are lenses or displays.

3. The eyeglass-shaped frame according to claim 1, wherein
both ends of the connecting bar are provided by vertical portions bent downward,
the vertical portions extend downward beyond a level of the temples, and
the holding frames respectively comprise guides interposed between the holding frames and the corresponding vertical portions.

4. The eyeglass-shaped frame according to claim 1, wherein
the shaft is in a form of a polygonal column, the slider comprises:
: a slide bearing configured to receive the shaft therein such that the slide bearing is slidable along the shaft;
a holder configured to hold the slide bearing at a predetermined position on the shaft; and
an antidrop member provided to an end of the shaft, and
the holder comprises:
an engagement piece attached to the slide bearing; and
a spring for pressing the engagement piece against the shaft.

5. The eyeglass-shaped frame according to claim 1, wherein
the slider comprises:
a clip body with a resilience enough to hold the shaft; and
tabs for opening an end of the clip body.

6. The eyeglass-shaped frame according to claim 1, wherein
the at least one shaft comprises a pair of shafts, the pair of shafts being each provided with a fall stopper at a lower end thereof, and
the slider comprises:
sliding portions configured to receive the respective shafts therein such that the sliding portions are slidable along the respective shafts;
a plate spring with a resilience enough for holding the sliding portions on the respective shafts; and
operation tabs for opening the plate spring.

7. The eyeglass-shaped frame according to claim 1, wherein
the shaft is in a form of a polygonal column, and
the slider comprises:
a slide bearing configured to receive the shaft therein such that the slide bearing is slidable along the shaft;
magnets configured to be attracted to respective upper and lower ends of the shaft; and
sheet irons attached to respective upper and lower ends of the slide bearing.

8. The eyeglass-shaped frame according to claim 1, wherein
the shaft is in a form of a polygonal column, and
the slider comprises:
a slide bearing configured to receive the shaft therein such that the slide bearing is slidable along the shaft;
two locking grooves provided to a surface of the slide bearing; and
locking pieces provided to respective upper and lower ends of the shaft, the locking pieces being engageable with the respective locking grooves.

9. An eyeglass-shaped frame comprising:
a pair of temples;
a connecting bar connecting respective ends of the pair of temples;
a shaft hanging from a middle of the connecting bar;
nose pads fixed to the shaft;
a pair of holding frames each configured to hold vertically arranged optical members;
a bridge connecting the pair of holding frames; and
a clip member fixed to a middle of the bridge and being detachable from the shaft, wherein
the holding frames are located in front of the connecting bar.

10. The eyeglass-shaped frame according to claim 9, wherein
the shaft is in a form of a polygonal column, and
the clip member comprises: a clip body with a resilience enough to hold the shaft; and tabs for opening an end of the clip body.

11. The eyeglass-shaped frame according to claim 9, wherein
the shaft is in a U-shape, and
the clip member comprises:
a pair of insertion portions configured to receive the shaft therein;
a substantially triangular plate spring to which respective ends of the insertion portions are fixed; and
operation tabs for opening the plate spring to increase a distance between the insertion portions.

12. The eyeglass-shaped frame according to claim 9, wherein
the optical members are lenses or displays.

13. The eyeglass-shaped frame according to claim 9, wherein
the connecting bar comprises: top sides facing the respective holding frames; and vertical portions that are bent downward from respective ends of the top sides,
the temples are connected to the respective vertical portions, and
the holding frames respectively comprise guides interposed between the holding frames and the corresponding vertical portions.

14. An eyeglass-shaped frame comprising:
a pair of temples;
a connecting bar connecting respective ends of the pair of temples;
a shaft standing at a middle of the connecting bar;
nose pads fixed to the shaft;
a pair of holding frames each configured to hold vertically arranged optical members;
a bridge connecting the pair of holding frames at a middle height of the holding frames; and
a bearing fixed to a middle of the bridge and detachably receiving the shaft therein,
the bearing receiving the shaft while the holding frames are in a first vertical orientation, and
the bearing receiving the shaft while the holding frames are in a second vertical orientation inverted relative to the first vertical orientation, wherein
a middle portion of the connecting bar is a stepped portion located lower than a level of the temples,
the shaft stands upward from the stepped portion of the connecting bar, and
the holding frames are located in front of the connecting bar.

15. The eyeglass-shaped frame according to claim 14, wherein
the shaft is in a form of a polygonal column having an end provided with a resilient slotted portion.

16. The eyeglass-shaped frame according to claim 14, wherein
the optical members are lenses or displays.

17. The eyeglass-shaped frame according to claim 14, wherein
the connecting bar comprises: top sides facing the respective holding frames; and vertical portions that are bent downward from respective ends of the top sides,
the temples are connected to the respective vertical portions, and
the holding frames respectively comprise guides interposed between the holding frames and the corresponding vertical portions.

* * * * *